US012485604B2

(12) United States Patent
Nakagawa et al.

(10) Patent No.: US 12,485,604 B2
(45) Date of Patent: Dec. 2, 2025

(54) POSITIONING METHOD, METHOD FOR MANUFACTURING LAYERED BODY, POSITIONING DEVICE, LAYERED BODY MANUFACTURING DEVICE, AND LAYERED BODY

(71) Applicant: TOHOKU UNIVERSITY, Sendai (JP)

(72) Inventors: Masaru Nakagawa, Sendai (JP); Subaru Harada, Sendai (JP); Toshiaki Hayakawa, Sendai (JP)

(73) Assignee: Tohoku University, Sendai (JP)

( * ) Notice: Subject to any disclaimer, the term of this patent is extended or adjusted under 35 U.S.C. 154(b) by 217 days.

(21) Appl. No.: 18/265,711

(22) PCT Filed: Nov. 5, 2021

(86) PCT No.: PCT/JP2021/040758
§ 371 (c)(1),
(2) Date: Jun. 7, 2023

(87) PCT Pub. No.: WO2022/149341
PCT Pub. Date: Jul. 14, 2022

(65) Prior Publication Data
US 2024/0042674 A1 Feb. 8, 2024

(30) Foreign Application Priority Data
Jan. 7, 2021 (JP) .................................. 2021-001685

(51) Int. Cl.
*B29C 59/02* (2006.01)
(52) U.S. Cl.
CPC .......... *B29C 59/022* (2013.01); *B29C 59/026* (2013.01)

(58) Field of Classification Search
CPC ... B29C 59/022; B29C 59/026; G03F 7/0002; G11B 7/00557; G11B 7/08505; G11B 7/126; G11B 7/26
See application file for complete search history.

(56) References Cited

U.S. PATENT DOCUMENTS

| 2009/0176167 A1 | 7/2009 | Hulsebos et al. |
| 2011/0075937 A1 | 3/2011 | Tate |

(Continued)

FOREIGN PATENT DOCUMENTS

| JP | 2005-518107 A | 6/2005 |
| JP | 2009-177159 A | 8/2009 |

(Continued)

OTHER PUBLICATIONS

Extended European Search Report dated Jun. 10, 2025, issued in corresponding European Patent Application No. 21917566.8.

(Continued)

*Primary Examiner* — Lawrence D Ferguson
(74) *Attorney, Agent, or Firm* — Morgan, Lewis & Bockius LLP

(57) ABSTRACT

A positioning method includes a layering step of layering a first object and a second object, a detection step of detecting, after the layering step, a first signal obtained from a first array body of the first object, a second signal obtained from a second array body of the first object, a third signal obtained from the second array body of the second object, and a fourth signal obtained from the first array body of the second object, a calculating step of calculating positional deviation between the first object and the second object by respectively fitting the first to fourth signals, and an adjustment step of adjusting the positional deviation. The first array body has a first periodic structure having a period $p_1$, and the second array body has a second periodic structure having a period $p_2$. Neither the first array body nor the second array (Continued)

body of the first object overlaps the second array body or the first array body of the second object when the first object and the second object are layered.

8 Claims, 24 Drawing Sheets

(56) References Cited

U.S. PATENT DOCUMENTS

2017/0293221 A1   10/2017   Nakagawa et al.
2019/0227446 A1    7/2019   Bijnen et al.

FOREIGN PATENT DOCUMENTS

| | | |
|---|---|---|
| JP | 2011-070602 A | 4/2011 |
| JP | 2017-062492 A | 3/2017 |
| JP | 2018-022807 A | 2/2018 |
| JP | 2019-525227 A | 9/2019 |
| WO | 03/071471 A1 | 8/2003 |

OTHER PUBLICATIONS

Office Action dated Jun. 10, 2025, issued in corresponding Japanese Patent Application No. 2022-573929.
Eri Kikuchi et al., Principle and observation of fluorescence moire fringes for alignment in print and imprint methods, J. Vac. Sci. Technol. B 35, 06G303 (2017).
International Search Report (with translation) and Written Opinion issued in corresponding International Patent Application No. PCT/JP2021/040758, dated Dec. 7, 2021.

FIG. 10

| ANALYSIS PERIOD | 5 PERIODS | | 10 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.001 | 3.405 | 0.202 | 2.540 |
| 1 nm | 2.090 | 3.420 | 1.300 | 2.516 |
| 2 nm | 2.502 | 3.391 | 2.164 | 3.281 |
| 5 nm | 2.358 | 4.121 | 2.817 | 4.117 |
| 10 nm | 8.785 | 3.299 | 7.239 | 2.466 |
| 20 nm | 18.63 | 3.586 | 17.75 | 3.029 |
| 50 nm | 56.30 | 4.036 | 53.05 | 2.751 |
| 100 nm | 99.96 | 3.928 | 101.14 | 2.710 |

| ANALYSIS PERIOD | 20 PERIODS | | 50 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.003 | 2.169 | 0.009 | 1.023 |
| 1 nm | 0.783 | 1.614 | 0.758 | 1.013 |
| 2 nm | 1.040 | 4.042 | 1.308 | 1.019 |
| 5 nm | 1.702 | 1.732 | 3.766 | 1.023 |
| 10 nm | 7.004 | 1.773 | 7.542 | 1.041 |
| 20 nm | 16.82 | 1.798 | 17.53 | 1.108 |
| 50 nm | 52.79 | 2.512 | 52.51 | 1.130 |
| 100 nm | 99.26 | 1.797 | 99.16 | 1.141 |

| ANALYSIS PERIOD | 100 PERIODS | | 120 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.000 | 0.726 | 0.014 | 0.660 |
| 1 nm | 0.732 | 0.714 | 0.829 | 0.653 |
| 2 nm | 1.289 | 0.715 | 1.393 | 0.654 |
| 5 nm | 3.645 | 0.720 | 3.640 | 0.658 |
| 10 nm | 7.635 | 0.737 | 7.580 | 0.673 |
| 20 nm | 17.11 | 0.781 | 17.14 | 0.714 |
| 50 nm | 52.29 | 0.797 | 52.29 | 0.728 |
| 100 nm | 99.21 | 0.809 | 98.98 | 0.738 |

FIG. 11

| ANALYSIS PERIOD | 5 PERIODS | | 10 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.021 | 1.090 | 0.003 | 0.565 |
| 1 nm | 1.263 | 1.366 | 1.152 | 0.702 |
| 2 nm | 2.270 | 1.140 | 2.090 | 0.679 |
| 5 nm | 5.160 | 1.110 | 5.230 | 0.656 |
| 10 nm | 10.08 | 1.170 | 10.04 | 0.705 |
| 20 nm | 20.10 | 1.020 | 20.14 | 0.645 |
| 50 nm | 50.36 | 1.120 | 50.07 | 0.565 |
| 100 nm | 100.07 | 0.832 | 100.19 | 0.747 |

| ANALYSIS PERIOD | 20 PERIODS | | 30 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.035 | 0.423 | 0.004 | 0.325 |
| 1 nm | 1.143 | 0.410 | 1.058 | 0.330 |
| 2 nm | 2.210 | 0.503 | 2.028 | 0.327 |
| 5 nm | 5.200 | 0.404 | 5.083 | 0.328 |
| 10 nm | 10.220 | 0.394 | 10.05 | 0.321 |
| 20 nm | 19.87 | 0.513 | 20.06 | 0.328 |
| 50 nm | 50.13 | 0.397 | 50.11 | 0.323 |
| 100 nm | 99.94 | 0.405 | 100.10 | 0.325 |

FIG. 12

| ANALYSIS PERIOD | 40 PERIODS | | 50 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.001 | 0.281 | 0.001 | 0.252 |
| 1 nm | 1.054 | 0.285 | 1.033 | 0.256 |
| 2 nm | 1.993 | 0.284 | 1.970 | 0.254 |
| 5 nm | 5.071 | 0.283 | 5.050 | 0.254 |
| 10 nm | 9.990 | 0.279 | 9.990 | 0.251 |
| 20 nm | 20.02 | 0.284 | 19.98 | 0.253 |
| 50 nm | 50.06 | 0.281 | 50.00 | 0.252 |
| 100 nm | 100.03 | 0.283 | 99.95 | 0.254 |

| ANALYSIS PERIOD | 100 PERIODS | | 120 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.000 | 0.178 | 0.000 | 0.163 |
| 1 nm | 1.033 | 0.180 | 1.043 | 0.165 |
| 2 nm | 1.970 | 0.181 | 1.970 | 0.165 |
| 5 nm | 5.090 | 0.179 | 5.100 | 0.163 |
| 10 nm | 9.990 | 0.188 | 9.960 | 0.162 |
| 20 nm | 20.00 | 0.179 | 19.98 | 0.163 |
| 50 nm | 50.06 | 0.178 | 50.02 | 0.162 |
| 100 nm | 99.97 | 0.179 | 98.94 | 0.163 |

FIG. 14

| RESOLUTION (px/mm) | SET DISPLACEMENT 1 (nm), ANALYSIS PERIOD [(LEFT) DETECTION VALUE (nm), (RIGHT) STANDARD ERROR (nm)] | | | | | | | | | |
|---|---|---|---|---|---|---|---|---|---|---|
| | 5 PERIODS | | 10 PERIODS | | 20 PERIODS | | 50 PERIODS | | 100 PERIODS | |
| 0.5 | 0.879 | 1.748 | 0.931 | 1.101 | 0.950 | 0.786 | 0.873 | 0.494 | 0.922 | 0.349 |
| 0.75 | 0.849 | 1.400 | 0.790 | 1.014 | 0.817 | 0.714 | 0.901 | 0.454 | 0.954 | 0.321 |
| 1 | 1.263 | 1.336 | 1.152 | 0.702 | 1.143 | 0.410 | 1.033 | 0.256 | 1.033 | 0.180 |
| 1.25 | 0.853 | 0.691 | 0.738 | 0.486 | 0.860 | 0.345 | 0.951 | 0.217 | 1.032 | 0.154 |

| RESOLUTION (px/mm) | SET DISPLACEMENT 2 (nm), ANALYSIS PERIOD [(LEFT) DETECTION VALUE (nm), (RIGHT) STANDARD ERROR (nm)] | | | | | | | | | |
|---|---|---|---|---|---|---|---|---|---|---|
| | 5 PERIODS | | 10 PERIODS | | 20 PERIODS | | 50 PERIODS | | 100 PERIODS | |
| 0.5 | 1.691 | 1.819 | 2.073 | 1.101 | 2.012 | 0.779 | 1.762 | 0.491 | 1.839 | 0.347 |
| 0.75 | 1.848 | 1.480 | 1.814 | 1.038 | 1.742 | 0.727 | 1.895 | 0.457 | 1.962 | 0.322 |
| 1 | 2.270 | 1.140 | 2.090 | 0.679 | 2.210 | 0.503 | 1.970 | 0.254 | 1.970 | 0.181 |
| 1.25 | 1.847 | 0.701 | 1.818 | 0.503 | 1.939 | 0.348 | 2.050 | 0.219 | 2.095 | 0.154 |

| RESOLUTION (px/mm) | SET DISPLACEMENT 5 (nm), ANALYSIS PERIOD [(LEFT) DETECTION VALUE (nm), (RIGHT) STANDARD ERROR (nm)] | | | | | | | | | |
|---|---|---|---|---|---|---|---|---|---|---|
| | 5 PERIODS | | 10 PERIODS | | 20 PERIODS | | 50 PERIODS | | 100 PERIODS | |
| 0.5 | 4.955 | 1.814 | 4.931 | 1.088 | 4.928 | 0.779 | 4.772 | 0.493 | 4.804 | 0.349 |
| 0.75 | 4.810 | 1.517 | 4.838 | 1.011 | 4.958 | 0.718 | 5.059 | 0.454 | 5.077 | 0.321 |
| 1 | 5.160 | 1.110 | 5.230 | 0.656 | 5.200 | 0.404 | 5.050 | 0.254 | 5.090 | 0.179 |
| 1.25 | 5.054 | 0.699 | 4.933 | 0.495 | 4.959 | 0.348 | 4.968 | 0.218 | 5.075 | 0.155 |

| L : S | SET DISPLACEMENT = 5 (nm) | |
|---|---|---|
| | DETECTION VALUE (nm) | STANDARD ERROR (nm) |
| 1 : 7 | 5.585 | 1.384 |
| 2 : 6 | 5.012 | 1.062 |
| 3 : 5 | 4.947 | 0.620 |
| 4 : 4 | 5.049 | 0.254 |
| 5 : 3 | 5.087 | 0.614 |
| 6 : 2 | 4.782 | 1.039 |
| 7 : 1 | 5.167 | 1.404 |

FIG. 22 g501:

| ANALYSIS PERIOD | 30 PERIODS | | 100 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.004 | 0.33 | 0.008 | 0.178 |
| 1 nm | 1.060 | 0.33 | 1.033 | 0.180 |
| 5 nm | 5.060 | 0.33 | 5.090 | 0.179 |
| 10 nm | 10.05 | 0.32 | 9.990 | 0.188 |
| AVERAGE STANDARD ERROR | — | 0.33 | — | 0.181 | g502:

| ANALYSIS PERIOD | 30 PERIODS | | 100 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.011 | 0.329 | 0.006 | 0.179 |
| 1 nm | 0.987 | 0.331 | 1.004 | 0.180 |
| 5 nm | 5.071 | 0.328 | 5.060 | 0.179 |
| 10 nm | 9.956 | 0.319 | 9.935 | 0.176 |
| AVERAGE STANDARD ERROR | — | 0.327 | — | 0.178 | g503:

| ANALYSIS PERIOD | 30 PERIODS | | 100 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.000 | 0.483 | 0.000 | 0.304 |
| 1 nm | 0.834 | 0.557 | 0.988 | 0.304 |
| 5 nm | 5.166 | 0.570 | 5.126 | 0.309 |
| 10 nm | 10.032 | 0.491 | 10.013 | 0.309 |
| AVERAGE STANDARD ERROR | — | 0.525 | — | 0.306 | g504

| ANALYSIS PERIOD | 30 PERIODS | | 100 PERIODS | |
|---|---|---|---|---|
| SET DISPLACEMENT | DETECTION VALUE (nm) | STANDARD ERROR (nm) | DETECTION VALUE (nm) | STANDARD ERROR (nm) |
| 0 nm | 0.041 | 3.25 | 0.008 | 1.78 |
| 10 nm | 10.58 | 3.30 | 10.33 | 1.80 |
| 50 nm | 50.83 | 3.28 | 50.90 | 1.79 |
| 100 nm | 100.47 | 3.21 | 99.90 | 1.88 |
| AVERAGE STANDARD ERROR | — | 3.26 | — | 1.81 | g505

| ANALYSIS PERIOD | 100 PERIODS | |
|---|---|---|
| SET DISPLACEMENT | DETECTION VALUE (nm) | STANDARD ERROR (nm) |
| 0 nm | 0.011 | 0.327 |
| 1 nm | 1.050 | 0.331 |
| 5 nm | 5.171 | 0.329 |
| 10 nm | 9.911 | 0.319 |
| AVERAGE STANDARD ERROR | — | 0.327 |

| RLT/D | DETECTION VALUE (nm) | STANDARD ERROR (nm) | THE NUMBER OF EFFECTIVE GRADATIONS |
|---|---|---|---|
| 0 | 5.011 | 0.313 | 2569 |
| 1 | 5.204 | 0.331 | 673 |
| 2 | 5.230 | 0.417 | 268 |
| 3 | 5.260 | 0.553 | 120 |
| 4 | 4.118 | 1.172 | 56 |
| 5 | 2.587 | 1.957 | 26 |

POSITIONING METHOD, METHOD FOR MANUFACTURING LAYERED BODY, POSITIONING DEVICE, LAYERED BODY MANUFACTURING DEVICE, AND LAYERED BODY

TECHNICAL FIELD

The present invention relates to a positioning method, a method for manufacturing a layered body, a positioning device, a layered body manufacturing device, and a layered body.

The present application claims priority based on Japanese Patent Application No. 2021-001685A filed on Jan. 7, 2021, and contents thereof are incorporated by reference.

BACKGROUND ART

In recent years, nano imprint lithography (NIL) is currently being researched and developed as a fine pattern transfer technique of an electronic device such as a semiconductor. In addition, a light irradiation type optical NIL using an ultraviolet curable resin (hereinafter, referred to as a resin) having fluidity is attracting attention as an inexpensive pattern transfer technique advantageous for mass production. When an electronic device is manufactured using the optical NIL, fine pattern transfer (lithography) may be performed a plurality of times (for example, 20 times or more). In this case, it is necessary to align an alignment mark formed on a substrate such as a wafer manufactured in a previous step with an alignment mark on a mold to be transferred with high accuracy.

As a method for performing such positioning, for example, it has been proposed to apply "moire phenomenon" (for example, see NPL 1). For example, PTL 1 proposes a technique for performing positioning by layering a mold including a mold-side alignment mark and a mold-side moire mark, a resin composition layer containing a fluorescent dye, and a patterned substrate including a substrate-side alignment mark and a substrate-side moire mark, detecting misalignment between the mold-side alignment mark and the substrate-side alignment mark, detecting misalignment between the mold-side moire mark and the substrate-side moire mark based on a fluorescence moire fringe, and moving the patterned substrate with respect to the mold based on the two detected misalignments.

CITATION LIST

Patent Literature

PTL 1: JP2018-22807A

Non Patent Literature

NPL 1: E. Kikuchi, Y. Ishito, S. Matsubara, T. Nakamura, M. Abe, and M. Nakagawa, "Principle and observation of fluorescence moire fringes for alignment in print and imprint methods", Journal of Vacuum Science & Technology B, 35 (2017) 06G303; doi: 10.1116/1.4990844

SUMMARY OF INVENTION

Technical Problem

However, in alignment by fluorescent imprinting in the related art, dependency of a pixel length (=element pixel pitch (CCD unique pixel pitch)/observation magnification) used for detection is large, a high observation magnification (for example, 50 times) is required, and a size and a cost of a device are increased. Further, in the related art, it is difficult to perform positioning between an upper object and a lower object with accuracy of an atomic scale error.

The invention has been made in view of the above problems, and an object thereof is to provide a positioning method, a method for manufacturing a layered body, a positioning device, a layered body manufacturing device, and a layered body, which can perform positioning between an upper object and a lower object with accuracy of an atomic scale error.

Solution to Problem

In order to achieve the above object, a positioning method according to an aspect of the invention includes: a layering step of layering a first object and a second object; a detection step of detecting, after the layering step, first light obtained from a first array body provided in the first object as a first signal, second light obtained from a second array body provided in the first object as a second signal, third light obtained from the second array body provided in the second object as a third signal, and fourth light obtained from the first array body provided in the second object as a fourth signal; a calculating step of calculating positional deviation between the first object and the second object by respectively fitting the detected first signal, the detected second signal, the detected third signal, and the detected fourth signal; and an adjustment step of adjusting the positional deviation. The first array body has a first periodic structure having a period $p_1$, and the second array body has a second periodic structure having a period $p_2$. Neither the first array body nor the second array body provided in the first object overlaps the second array body or the first array body provided in the second object when the first object and the second object are layered.

In the positioning method according to an aspect of the invention, the first signal, the second signal, the third signal, and the fourth signal that are obtained from the first array body and the second array body may be luminescence from a layer located between the first object and the second object.

In the positioning method according to an aspect of the invention, the first signal, the second signal, the third signal, and the fourth signal that are obtained from the first array body and the second array body may be scattered light of the first array body and the second array body.

In the positioning method according to an aspect of the invention, in the layering step, the first object and the second object may be layered such that a gap therebetween is 3 μm or less.

In the positioning method according to an aspect of the invention, the first array body may have the first periodic structure having a period of 20 or more, and the second array body may have the second periodic structure having a period of 20 or more.

In order to achieve the above object, a method for manufacturing a layered body including a first object and a second object according to an aspect of the invention includes: a layering step of layering the first object and the second object such that neither a first array body having a first periodic structure having a period $p_1$ nor a second array body having a second periodic structure having a period $p_2$ provided in the first object overlaps the second array body or the first array body provided in the second object when the first object and the second object are layered; a detection step of detecting, after the layering step, first light obtained from the first array body provided in the first object as a first signal, second light obtained from the second array body as a second signal, third light obtained from the second array body provided in the second object as a third signal, and fourth light obtained from the first array body as a fourth signal; a calculating step of calculating positional deviation between the first object and the second object by respectively fitting the detected first signal, the detected second signal, the detected third signal, and the detected fourth signal; and an adjustment step of adjusting the positional deviation.

In order to achieve the above object, a positioning device for layering a first object and a second object and positioning positional deviation between the first object and the second object according to an aspect of the invention includes: a layering means for layering the first object and the second object such that neither a first array body having a first periodic structure having a period $p_1$ nor a second array body having a second periodic structure having a period $p_2$ provided in the first object overlaps the second array body or the first array body provided in the second object when the first object and the second object are layered; a detecting means for detecting, for a layered body in which the first object and the second object are layered, first light obtained from the first array body provided in the first object as a first signal, second light obtained from the second array body as a second signal, third light obtained from the second array body provided in the second object as a third signal, and fourth light obtained from the first array body as a fourth signal; a calculating means for calculating the positional deviation between the first object and the second object by respectively fitting the detected first signal, the detected second signal, the detected third signal, and the detected fourth signal; and an adjusting means for adjusting the positional deviation.

In order to achieve the above object, a layered body manufacturing device for manufacturing a layered body by layering a first object and a second object according to an aspect of the invention includes: a layering means for layering the first object and the second object such that neither a first array body having a first periodic structure having a period $p_1$ nor a second array body having a second periodic structure having a period $p_2$ provided in the first object overlaps the second array body or the first array body provided in the second object when the first object and the second object are layered; a detecting means for detecting, for a layered body in which the first object and the second object are layered, first light obtained from the first array body provided in the first object as a first signal, second light obtained from the second array body as a second signal, third light obtained from the second array body provided in the second object as a third signal, and fourth light obtained from the first array body as a fourth signal; a calculating means for calculating positional deviation between the first object and the second object by respectively fitting the detected first signal, the detected second signal, the detected third signal, and the detected fourth signal; and an adjusting means for determining a layering position by adjusting the positional deviation.

In order to achieve the above object, a layered body according to an aspect of the invention includes: a first object including a first array body having a first periodic structure having a period $p_1$ and a second array body having a second periodic structure having a period $p_2$; and a second object including the second array body and the first array body. The first object and the second object are layered such that neither the first array body nor the second array body provided in the first object overlaps the second array body or the first array body provided in the second object.

Advantageous Effects of Invention

According to the positioning method, the method for manufacturing a layered body, the positioning device, the layered body manufacturing device, and the layered body in the above aspects, positioning between an upper object and a lower object with accuracy of an atomic scale error can be performed.

BRIEF DESCRIPTION OF DRAWINGS

FIG. 10 is a diagram showing detection values and standard errors when resolution of the light intensity is 256 gradations of 8 bits and analysis periods are 5 periods, 10 periods, 20 periods, 50 periods, 100 periods, and 120 periods.

FIG. 11 is a diagram showing detection values and standard errors when the resolution of the light intensity is 4096 gradations of 12 bits and the analysis periods are 5 periods, 10 periods, 20 periods, 30 periods, periods, 50 periods, 100 periods, and 120 periods.

FIG. 12 is a diagram showing detection values and standard errors when the resolution of the light intensity is 4096 gradations of 12 bits and the analysis periods are 5 periods, 10 periods, 20 periods, 30 periods, periods, 50 periods, 100 periods, and 120 periods.

FIG. 14 is a diagram showing a result of verification of dependency of resolution (the number of pixels per 1 (μm)) on detection accuracy (detection value and standard error) of the positional deviation amount.

FIG. 22 is a diagram showing a result example of verification of the period of the array body.

DESCRIPTION OF EMBODIMENTS

Figure 1:
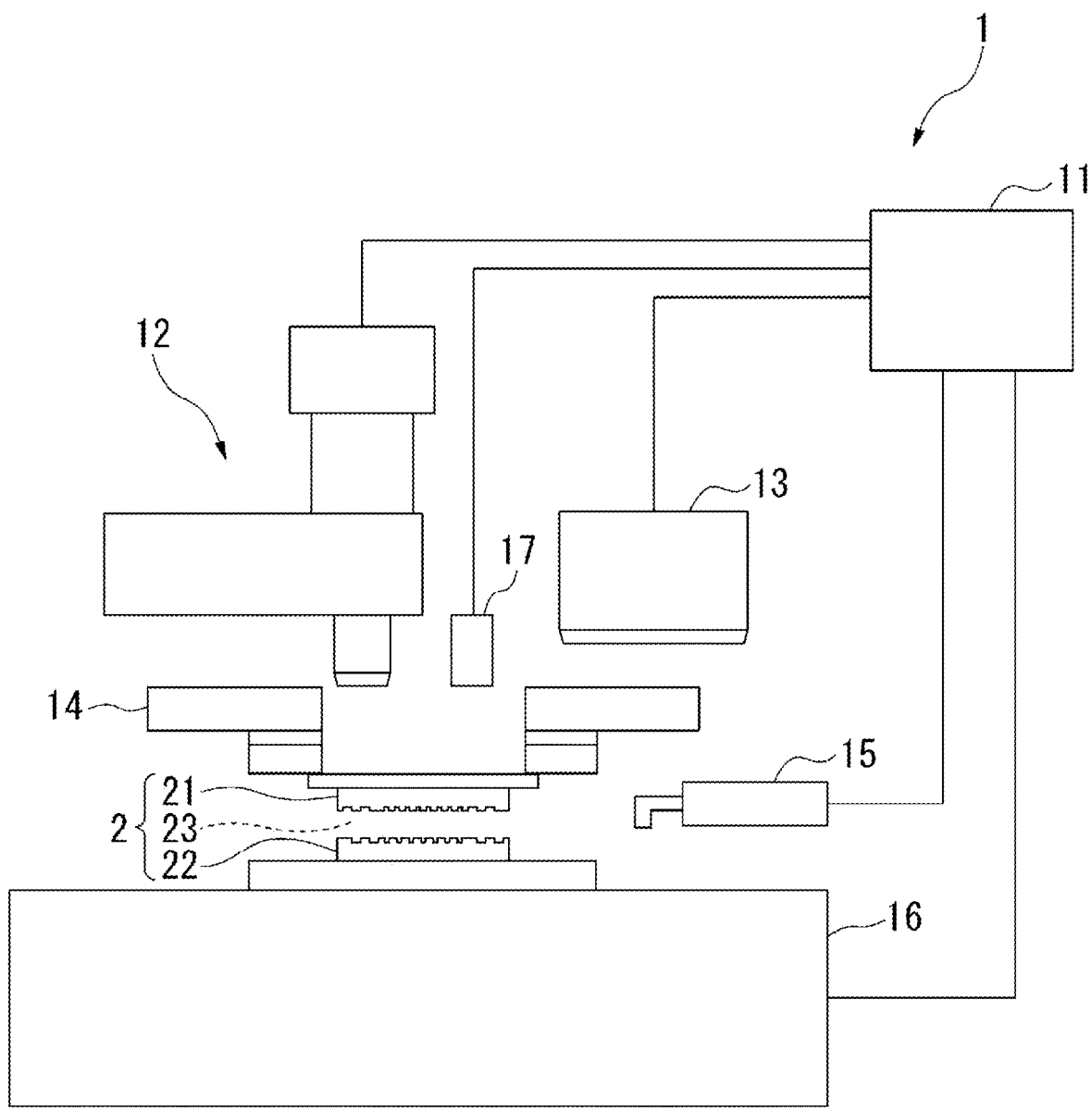
FIG. 1 is a diagram showing an example of a configuration of a positioning device according to an embodiment.

Hereinafter, an embodiment of the invention will be described with reference to the drawings. In the drawings used for the following description, a scale of each member is appropriately changed in order to set a size of each member such that the member is recognizable.
<Configuration Example of Positioning Device (Layered Body Manufacturing Device)>

FIG. 1 is a block diagram showing an example of a configuration of a positioning device according to the present embodiment. A positioning device 1 is also a layered body manufacturing device 1, and is also an imprint device 1. As shown in FIG. 1, the positioning device 1 includes a control device 11, a microscope device 12, an ultraviolet irradiation device 13, a fixed stage 14, a coating device 15, an XYZ θ axis movable stage 16, and an illumination device 17.

The positioning device 1 layers a mold (first object) 21 and a substrate (second object) 22, and performs positioning between the mold 21 and the substrate 22 based on light from an array body formed on the mold 21 and an array body formed on the substrate 22. The light from the array bodies is luminescence from a layer located between the mold 21 and the substrate 22, or scattered light from the mold 21 and the substrate 22. In addition, a layer 23 between the mold 21 and the substrate 22 is, for example, a liquid such as an ultraviolet curable visible fluorescent liquid or a gas such as air. In the present embodiment, the luminescence is, for example, fluorescence or phosphorescence from the layer located between the first object and the second object.

The control device 11 controls the microscope device 12, the ultraviolet irradiation device 13, the fixed stage 14, the coating device 15, the XYZ θ axis movable stage 16, and the illumination device 17 to perform layering and positioning. The control device 11 calculates a positional deviation amount between the mold 21 and the substrate 22 by fitting, using a predetermined equation, a signal obtained by the microscope device 12 detecting the light from the array bodies using illumination light from the illumination device 17. The control device 11 performs the positioning between the mold 21 and the substrate 22 by the XYZ θ axis movable stage 16 based on the calculated positional deviation amount.

The microscope device 12 includes a plurality of detection pixels, and detects the light from the array bodies. An observation magnification of the microscope device 12 is, for example, 7 times, and a numerical aperture (NA) is, for example, 0.08. In addition, a pixel length (pixel length of the detection pixel) used for the detection is, for example, 0.837 (μm).

According to the control of the control device 11, the ultraviolet irradiation device 13 cures an ultraviolet curable resin (ultraviolet curable visible fluorescent liquid) including, for example, a fluorescent dye by ultraviolet irradiation to manufacture a layered body.

The fixed stage 14 holds, for example, the mold 21 according to the control of the control device 11.

According to the control of the control device 11, the coating device 15 applies, to the substrate 22, for example, the ultraviolet curable visible fluorescent liquid, which is the layer located between the mold 21 and the substrate 22.

The XYZ θ axis movable stage 16 moves, for example, the substrate 22 according to the control of the control device 11.

<Configuration Example of Layered Body>

Figure 2:
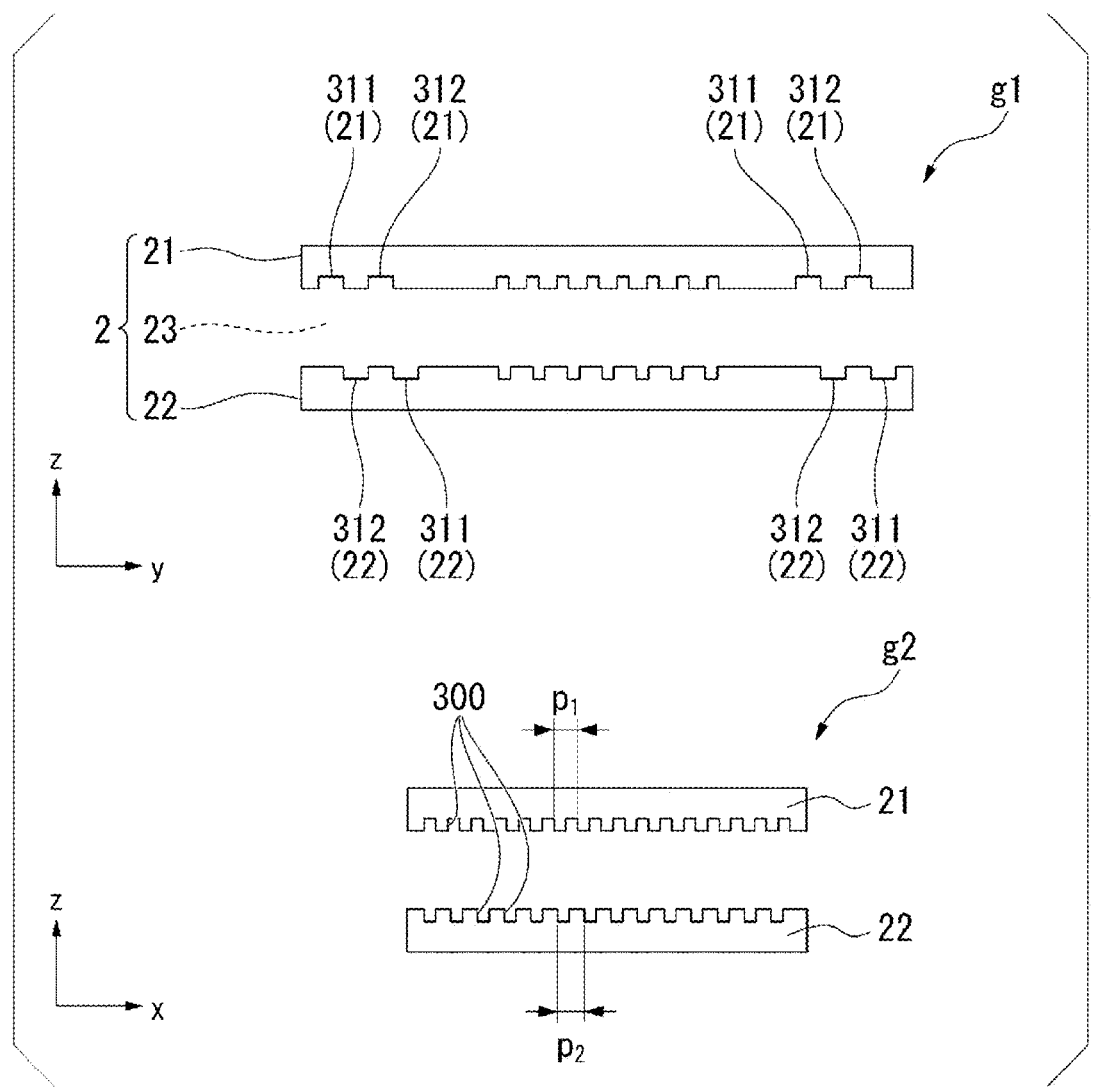
FIG. 2 is a diagram showing a configuration example of a layered body according to the embodiment.

Next, a configuration example of the layered body will be described. FIG. 2 is a diagram showing the configuration example of the layered body according to the present embodiment. As shown in FIG. 2, the layered body 2 includes the mold 21, the layer 23, and the substrate 22 as in a configuration diagram g1 in a yz plane.

In the mold 21, in a y axis direction, a first array body 311 (21) and a second array body 312 (21) are formed at both ends in the y axis direction, and for example, a circuit pattern is formed between the first array body 311 (21) at one end and the first array body 311 (21) at the other end.

In the substrate 22, in the y axis direction, a second array body 312 (22) and a first array body 311 (22) are formed at both ends in the y axis direction, and for example, a circuit pattern is formed between the second array body 312 (22) at one end and the second array body 312 (22) at the other end.

As in the configuration diagram g1, the first array body 311 (21) and the second array body 312 (21) of the mold 21, and the second array body 312 (22) and the first array body 311 (22) of the substrate 22 do not overlap in the y axis direction when layered.

As in a configuration diagram g2 in the xz plane, a first array body including a plurality of bars 300 having a period $p_1$ in an x axis direction is formed on the mold 21. In addition, a second array body including a plurality of bars 300 having a period $p_2$ in the x axis direction is formed on the substrate 22.

For example, when the luminescence such as fluorescence is detected as a signal, visible light is emitted from the illumination device 17, the luminescence such as fluorescence is emitted from the ultraviolet curable visible fluorescent liquid of the layer 23, and light signals from the array bodies are detected by the microscope device 12. By respectively fitting the detected first signal, second signal, third signal, and fourth signal, positional deviation between the first object and the second object is calculated by a calculating means. After the positional deviation is adjusted, ultraviolet rays are emitted from the ultraviolet irradiation device 13 to solidify the ultraviolet curable visible fluorescent liquid of the layer 23, so that a layered body including the mold 21, the layer 23, and the substrate 22 can be manufactured. In addition, for the illumination device 17, for example, a light source such as a light emitting diode (LED), or a white lamp, a xenon (Xe) lamp or a halogen lamp in which a band-pass filter or a cutoff filter for adjusting an irradiation wavelength is mounted can be used. When the layer 23 is an ultraviolet curable visible fluorescent liquid, any light source may be used as long as fluidity of the layer 23 is maintained and the positioning can be performed while the light signals from the array bodies are detected. For the ultraviolet irradiation device 13, for example, a light source such as an ultraviolet light-emitting diode (UV-LED), a mercury-xenon (Hg—Xe) lamp, or a high-pressure mercury lamp can be used. Any light source may be used as long as the light source can solidify the ultraviolet curable visible fluorescent liquid of the layer 23. The microscope device 12 is provided with an imaging element that removes light having wavelengths of the irradiation light from the ultraviolet irradiation device 13 and the illumination light from the illumination device 17 and that detects the luminescence such as fluorescence having a longer wavelength.

When the scattered light is detected as a signal, the scattered light is generated from the mold 21 and the substrate 22 by emitting visible light or the like from the illumination device 17, and a light signal from each of the array bodies having the same wavelength as the illumination light is detected by the microscope device 12. By respectively fitting the detected first signal, second signal, third signal, and fourth signal, the positional deviation between the first object and the second object is calculated by the calculating means. After the positional deviation is adjusted, the ultraviolet rays from the ultraviolet irradiation device 13 are drawn at a predetermined position of the mold 21 and the substrate 22 to perform fusing. Accordingly, a layered body in which the mold 21 and the substrate 22 interpose a gas layer such as air of the layer 23 can be manufactured. For the ultraviolet irradiation device 13, for example, a high output short pulse laser such as a UV laser can be suitably used. According to materials of the mold 21 and the substrate 22, a high output ultrashort pulse laser that generates visible light or infrared light, or the like may be used. The microscope device 12 is provided with an imaging element that detects scattered light having the same wavelength as the illumination light from the illumination device 17.

<Arrangement Example of Array Body>

Figure 3:
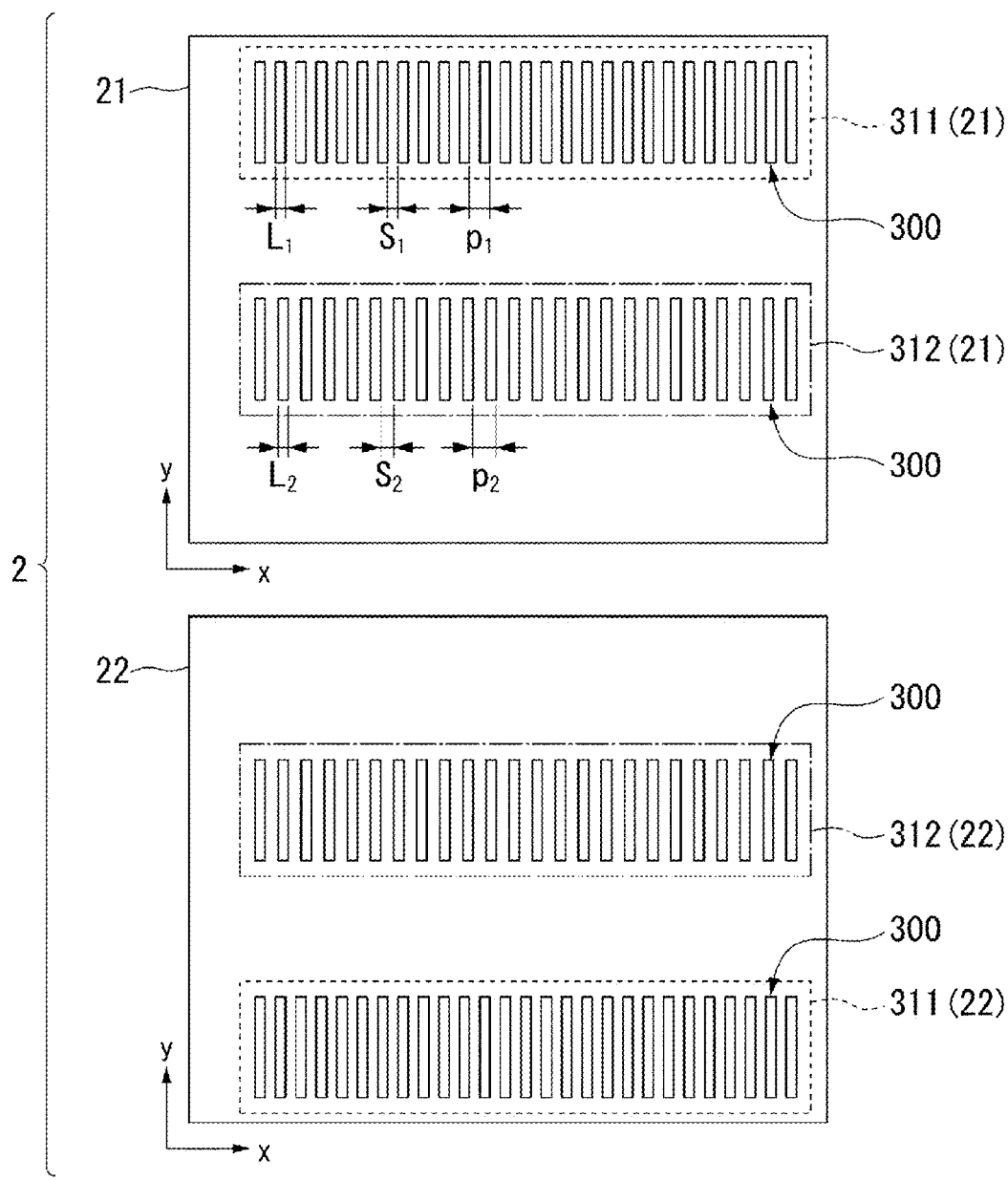
FIG. 3 is a diagram showing an arrangement example of an array body formed on a mold and an array body formed on a substrate according to the embodiment.

Next, an arrangement example of the array body formed on the mold 21 and the array body formed on the substrate 22 will be further described. FIG. 3 is a diagram showing an arrangement example of an array body formed on a mold and an array body formed on a substrate according to the present embodiment. In FIG. 3, there is a concave structure of the array body formed on the mold 21 on a back side of a paper surface, and there is a concave structure of the array body formed on the substrate 22 on a front side of the paper surface. In FIG. 3, a lateral direction of the bars 300 constituting the array bodies formed on the mold 21 and the substrate 22 is taken as the x axis direction, and a longitudinal direction of the bars 300 is taken as the y axis direction. Assemblies of the first array body 311 (21) and the second array body 312 (21) that are disposed on the mold 21, and the second array body 312 (22) and the first array body 311 (22) that are disposed on the substrate 22 may be located at, for example, four corners of the mold 21 and the substrate 22, or two diagonally opposing corners. In addition, the assemblies of the array bodies are preferably located at both ends of the mold 21 and the substrate 22.

As shown in FIG. 3, the first array body 311 (21) and the second array body 312 (21) are formed on the mold 21. In addition, the second array body 312 (22) and the first array body 311 (22) are formed on the substrate 22. In the first array body 311, the bars 300 are arranged at a period $p_1$ in the x axis direction. A width (width of bar) of the bar 300 of the first array body 311 in the lateral direction is $L_1$, and a space width (space width) between the bars is $S_1$. In the second array body 312, the bars 300 are arranged at a period $p_2$ in the x axis direction. A width of the bar 300 of the second array body 312 in the lateral direction is $L_2$, and a space width between the bars is $S_2$. In the following description, when the width $L_1$ of the bar 300 of the first array body 311 in the lateral direction and the width $L_2$ of the bar 300 of the second array body 312 in the lateral direction are not distinguished, the width $L_1$ and the width $L_2$ are referred to as a "width L of the bar 300 in the lateral direction" or a "width L of the bar 300". In addition, when the space width $S_1$ of the first array body 311 and the space width $S_2$ of the second array body 312 are not distinguished, the space width $S_1$ and the space width $S_2$ are referred to as a "space width S".

Each bar 300 constituting the array body in FIG. 3 has a length in the y axis direction that is longer than the width in the x axis direction. A shape of each bar 300 is not limited to a rectangle as in FIG. 3, and may be, for example, a square, an ellipse, or the like. In addition, a size of the bars 300 constituting the first array body 311 and a size of the bars 300 constituting the second array body 312 may be the same or different.

Figure 4:
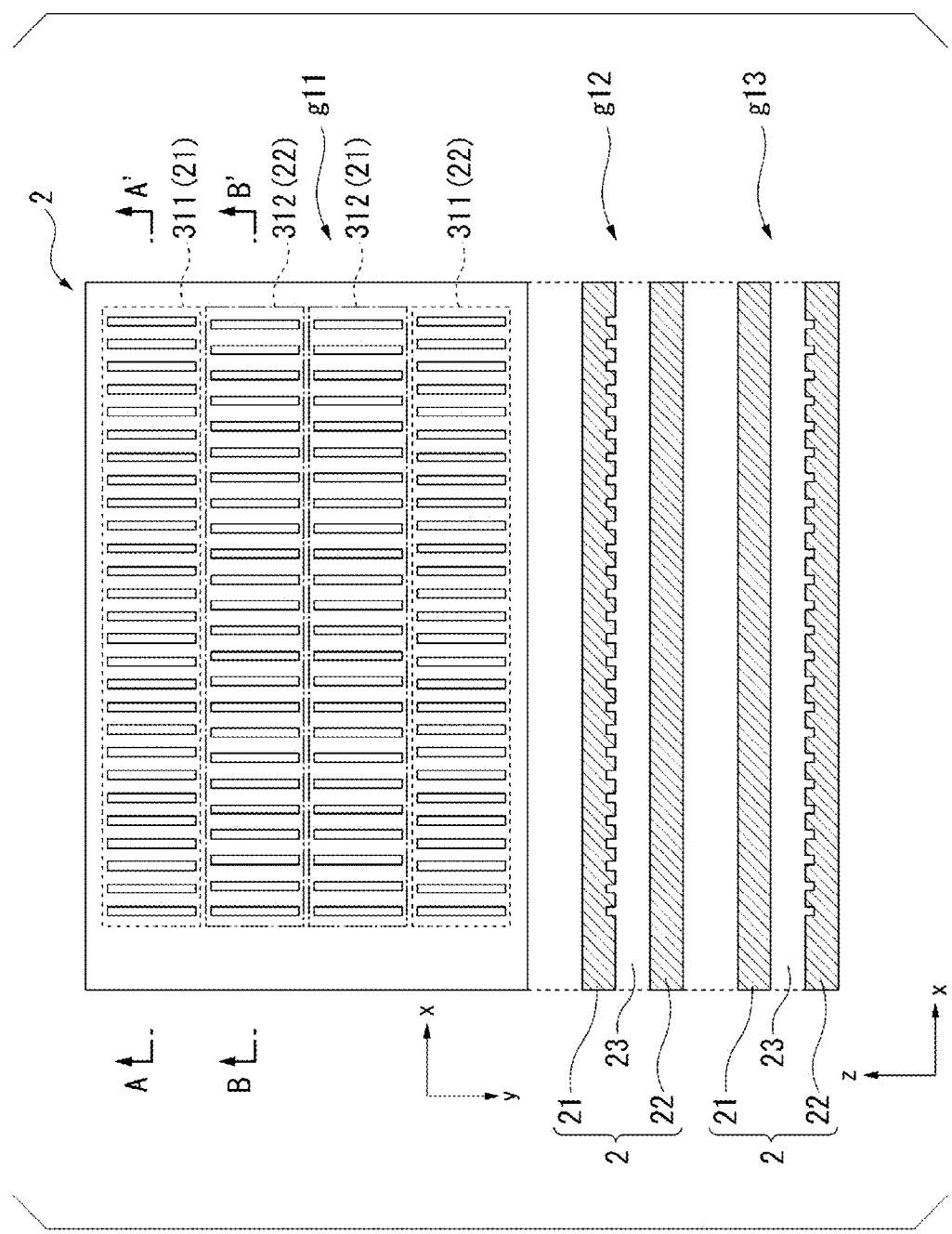
FIG. 4 is a diagram showing an example of a positional relationship between the array bodies on the mold and the substrate in the layered body according to the embodiment.

FIG. 4 is a diagram showing an example of a positional relationship between the array bodies on the mold and the substrate in the layered body according to the present embodiment. A plan view g11 is a view of the layered body 2 viewed from, for example, a mold 21 side. A cross-sectional view g12 is a cross-sectional view taken along a line A-A' in the plan view g11. A cross-sectional view g13 is a cross-sectional view taken along a line B-B' in the plan view g11.

As shown in FIG. 4, neither the first array body 311 (21) nor the second array body 312 (21) of the mold 21 overlaps the second array body 312 (22) or the first array body 311 (22) of the substrate 22 when the mold 21 and the substrate 22 are layered. When the array bodies are layered, the first array body 311 (21) of the mold 21, the second array body 312 (22) of the substrate 22, the second array body 312 (21) of the mold 21, and the first array body 311 (22) of the substrate 22 are arranged in this order in the y axis direction.

As shown in the cross-sectional view g12, the layer 23 to which, for example, the ultraviolet curable visible fluorescent liquid is applied is present between the mold 21 and the substrate 22. Further, a medium having a refractive index different from that of the mold 21 and the substrate 22, for example, the layer 23 of a gas such as air is present between the mold 21 and the substrate 22.

Figure 5:
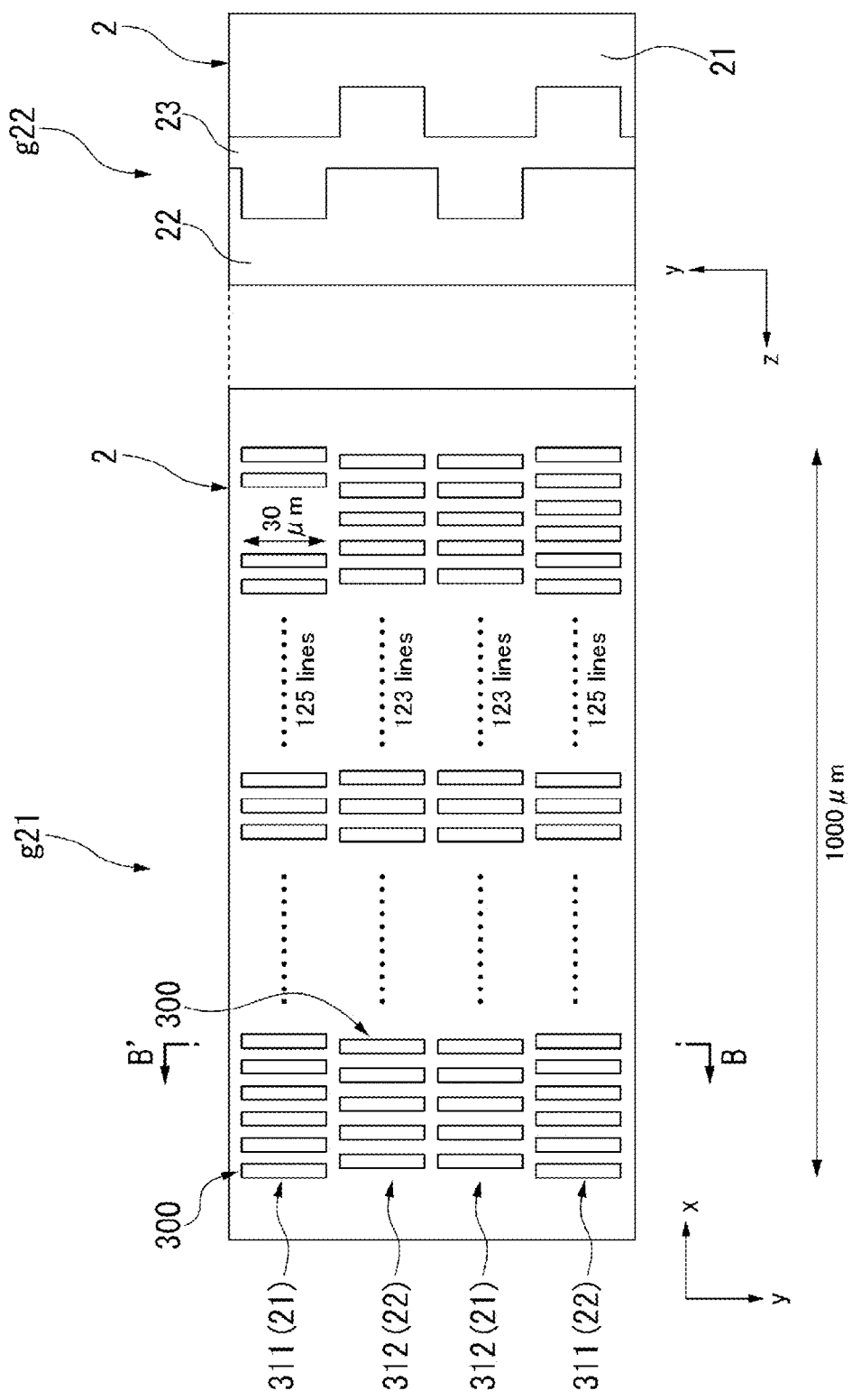
FIG. 5 is a diagram showing a shape, the number, and the like of bars according to the embodiment.

Next, the shape, the number, and the like of the bars will be described. FIG. 5 is a diagram showing the shape, the number, and the like of the bars according to the present embodiment. A plan view g21 is a view of the layered body 2 viewed from, for example, the mold 21 side. A cross-sectional view g22 is a cross-sectional view taken along a line B-B' in the plan view g21.

The first array bodies 311 (21, 22) have a periodic structure in which, for example, the number of bars 300 is 125 and the period $p_1$ is 8.0 (μm) in 1000 (μm). The second array bodies 312 (21, 22) have a periodic structure in which, for example, the number of bars 300 is 123 and the period $p_2$ is 8.1 (μm) in 1000 (μm). In addition, the length of the bar 300 in the y axis direction is, for example, 30 (μm). Further, a length of the bar 300 in the x axis direction is preferably half a length of the period $p_1$ or half a length of the period $p_2$. A length of the bars 300 of the second array bodies 312 (21, 22) in the x axis direction may be different from a length of the bars 300 of the first array bodies 311 (21, 22) in the x axis direction, or may be the same as the length of the bars 300 of the first array bodies 311 (21, 22) in the x axis direction. In FIG. 5, when the first signal, the second signal, the third signal, and the fourth signal that are obtained from the first array body and the second array body are the luminescence from the layer located between the first object and the second object, the bar 300 is in a state in which a gap formed between the mold 21 and the substrate 22 is filled with the ultraviolet curable visible fluorescent liquid. It is sufficient that the luminescence from the array body of each of the mold 21 and the substrate 22 having a large light intensity can be detected from the layer 23 via the microscope device 12.

In FIG. 5, when the first signal, the second signal, the third signal, and the fourth signal that are obtained from the first array body and the second array body are the scattered light of the first array body and the second array body, the bar 300 is in a state in which a fine concave structure is formed. For example, the bar 300 is in a state in which a fine concave structure is formed in which a hole having a diameter of 0.2 (μm) and a depth of 0.1 (μm) is hexagonal close-packed at intervals of a period 0.4 (μm). The hole may have a circular shape or a quadrangular shape. The diameter of the hole is preferably smaller than a detection pixel length. It is sufficient that scattered light having the same wavelength as the illumination light from the illumination device 17 can be detected via the microscope device 12.

The shape and the number of bars 300 shown in FIG. 5 are merely examples, and the invention is not limited thereto.

<Relationship Between Light Emitting Body and Detected Pixel Length (Size)>

Figure 6:
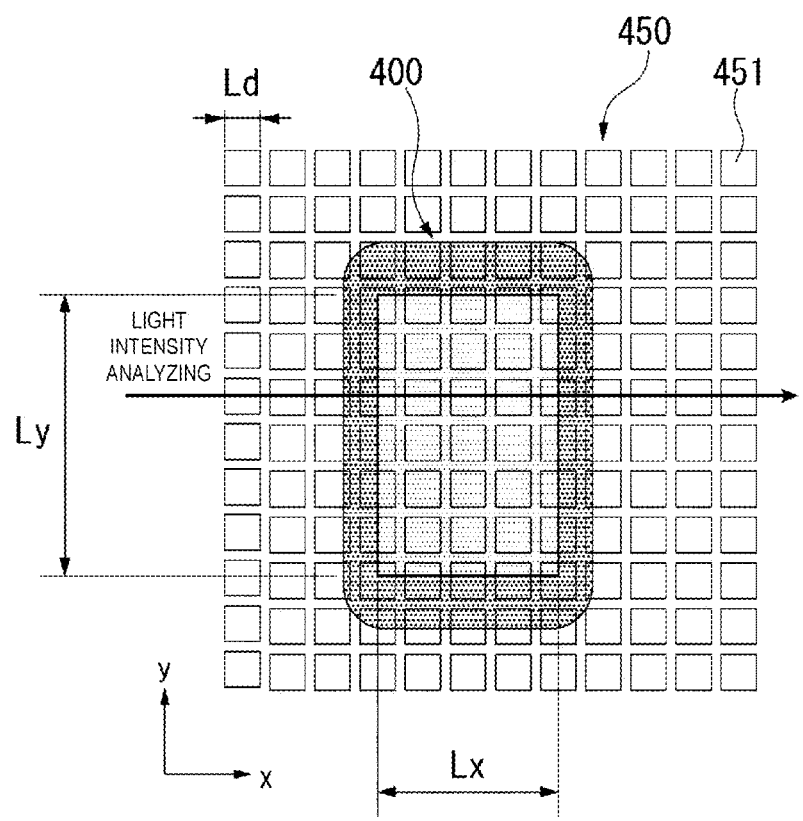
FIG. 6 is a diagram showing a relationship example between a light emitting body and a pixel size of an imaging element in a comparative example.

Next, a relationship between a light emitting body 400 and a pixel length Ld of a detection pixel 451 imaged by an imaging element 450 of the microscope device 12 will be described. FIG. 6 is a diagram showing a relationship example between a light emitting body and a pixel length of a detection pixel in a comparative example. Light from the light emitting body 400 is light obtained from one of the bars 300 in which a length Lx in the x axis direction is 4.0 (μm) and a length Ly in the y axis direction is 6.0 (μm).

In FIG. 6, the imaging element 450 includes a plurality of detection pixels 451 having a CCD unique pixel pitch of 7 (μm). An imaging magnification is seven times, and the pixel pitch (period of vertical and horizontal sizes Ld of each detection pixel 451) detected during imaging is 1 (μm).

A size of the light emitting body 400 detected by the imaging element 450 is detected to be larger than that of the bar 300 due to spread of light.

The comparative example in FIG. 6 is an example in which the light emitting body 400 is one. In such a case, for example, a gravity center position of the bar 300, which is a light source, in the lateral direction is estimated by analyzing a light intensity of the light emitting body 400 in the lateral direction. However, when the imaging magnification is a low magnification of seven times, the position can be estimated only with accuracy of, for example, about ±0.1 (μm) even when the light intensity is fitted in the x axis direction.

Figure 7:
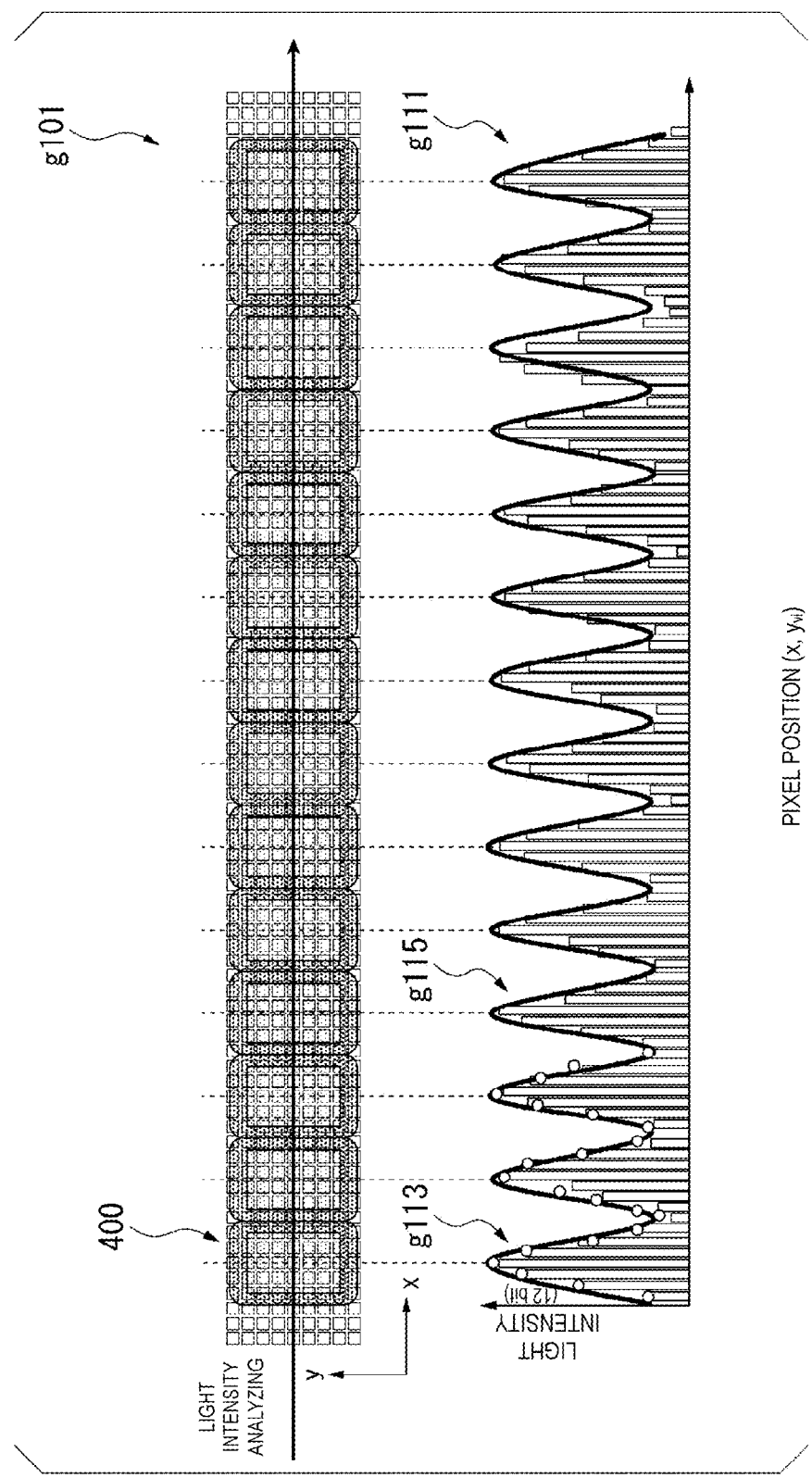
FIG. 7 is a diagram showing an array example of light emitting bodies and a fitting example of a light intensity according to the embodiment.

FIG. 7 is a diagram showing an array example of 14 light emitting bodies and a fitting example of the light intensity according to the present embodiment. The size of one bar 300, which is the light source, in FIG. 7 is the same as that in FIG. 6. The 14 bars 300 are arranged at a pitch of 8.0 (μm) of the bars 300 in the lateral direction. In addition, the CCD unique pixel pitch is also 7 (μm) and is the same as that in the comparative example in FIG. 6. Further, the imaging magnification is also seven times, and the pixel pitch detected during imaging is 1 (μm), which is the same as that in the comparative example in FIG. 6.

As shown in an arrangement view g101, the light emitting bodies 400 are arranged at a predetermined pitch (predetermined period) of 8.0 (μm).

In the present embodiment, a light intensity of a light signal of the light emitting body 400 is fitted as shown in a graph g111. In the graph g111, a horizontal axis represents a pixel position, and a vertical axis represents the light intensity. In addition, in the graph g111, a point g113 represents the detected light intensity, and a line g115 represents a fitted theoretical curve (for example, cos waveform). In the present embodiment, the light intensity is detected with a resolution (the number of gradations: 4096) of 12-bit accuracy.

In this way, in the present embodiment, the light emitting bodies 400 are arranged at a predetermined period, and a center position of each light emitting body 400 is estimated by fitting the light intensity in the x axis direction with the resolution of 12 bits, so that the position can be estimated with accuracy of, for example, about ±0.3 (nm) even at a low magnification of seven times.

The size and the pitch of the light emitting body, the pixel size of the imaging element, the imaging magnification, the pixel size during imaging, the resolution of the light intensity, and the like shown in FIG. 7 are merely examples, and the invention is not limited thereto.

In this way, according to the present embodiment, the positional deviation amount can be accurately detected by an optical system having a low magnification without using the moire as in the related art. In addition, according to the present embodiment, dependency on the detection pixel length can be reduced as compared with that in the related art.

<Positioning>

Next, a positioning method for the mold 21 and the substrate 22 will be described.

Figure 8:
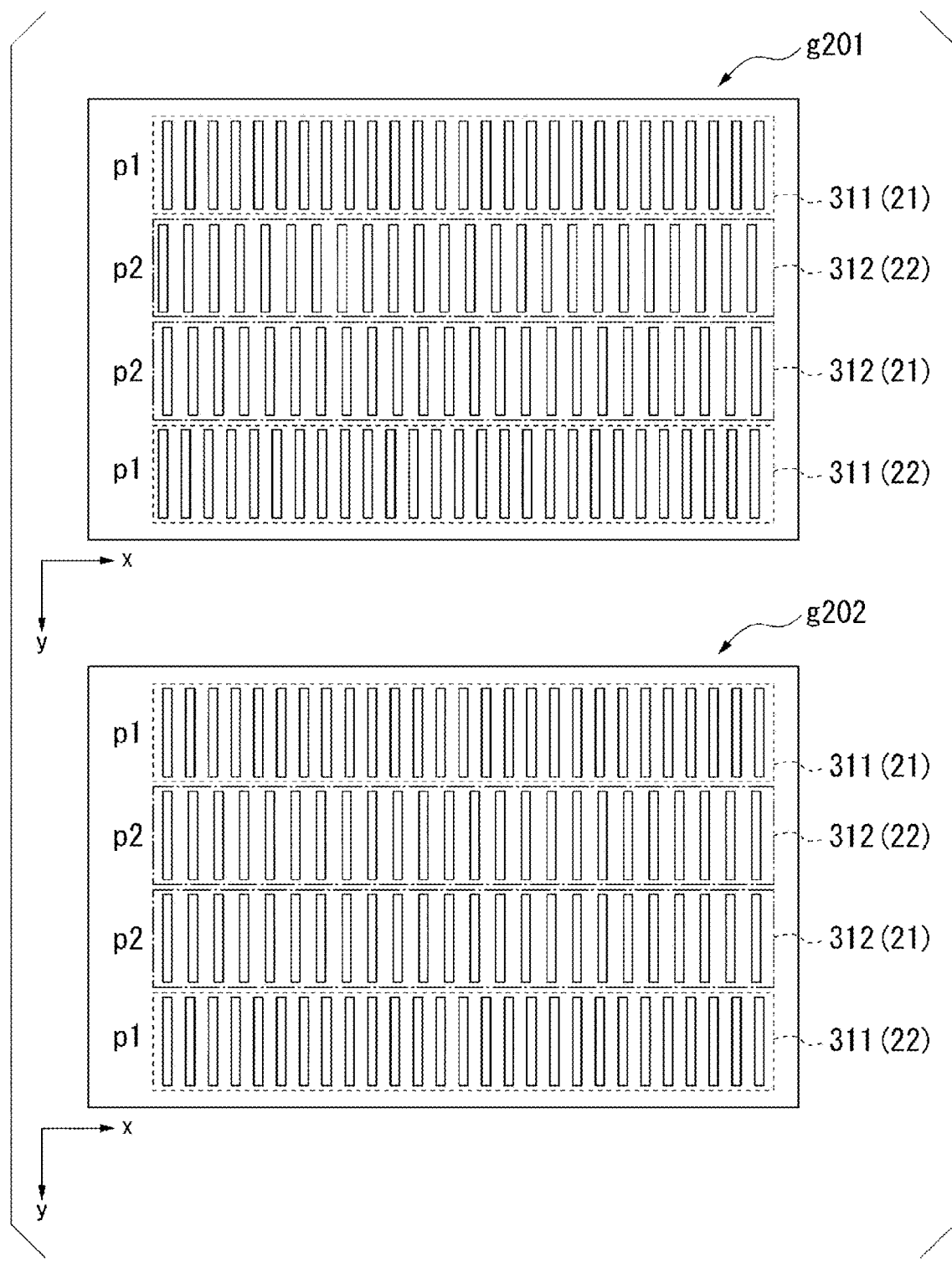
FIG. 8 is a diagram showing a position example of the array bodies before and after adjustment of positional deviation according to the embodiment.

FIG. 8 is a diagram showing a position example of the array bodies before and after adjustment of the positional deviation according to the present embodiment.

In the present embodiment, the positional deviation amount is detected by fitting the light signal obtained from the light from the array body, and the positioning between the mold 21 and the substrate 22 is performed based on the detected positional deviation amount.

In a layered state g201 before the positioning, positions of the first array body 311 (21) of the mold 21 and the first array body 311 (22) of the substrate 22 are deviated, and positions of the second array body 312 (21) of the mold 21 and the second array body 312 (22) of the substrate 22 are deviated.

In a layered state g202 after the positioning, the positions of the first array body 311 (21) of the mold 21 and the first array body 311 (22) of the substrate 22 coincide with each other, and the positions of the second array body 312 (21) of the mold 21 and the second array body 312 (22) of the substrate 22 coincide with each other.

Here, a length of the bar 300 in the lateral direction is 4 (μm), and a length of the bar 300 in the longitudinal direction is 30 (μm). A depth (D) of the bar 300 is 0.1 (μm). The period $p_1$ of the first array body 311 is 8.0 (μm), and the period $p_2$ of the second array body is 8.1 (μm).

In the example shown in FIG. 8, an example of the positioning in the x axis direction has been described, and it is also possible to detect a positional deviation amount in the y axis direction and to perform positioning by arranging the array bodies as described later.

Figure 9:
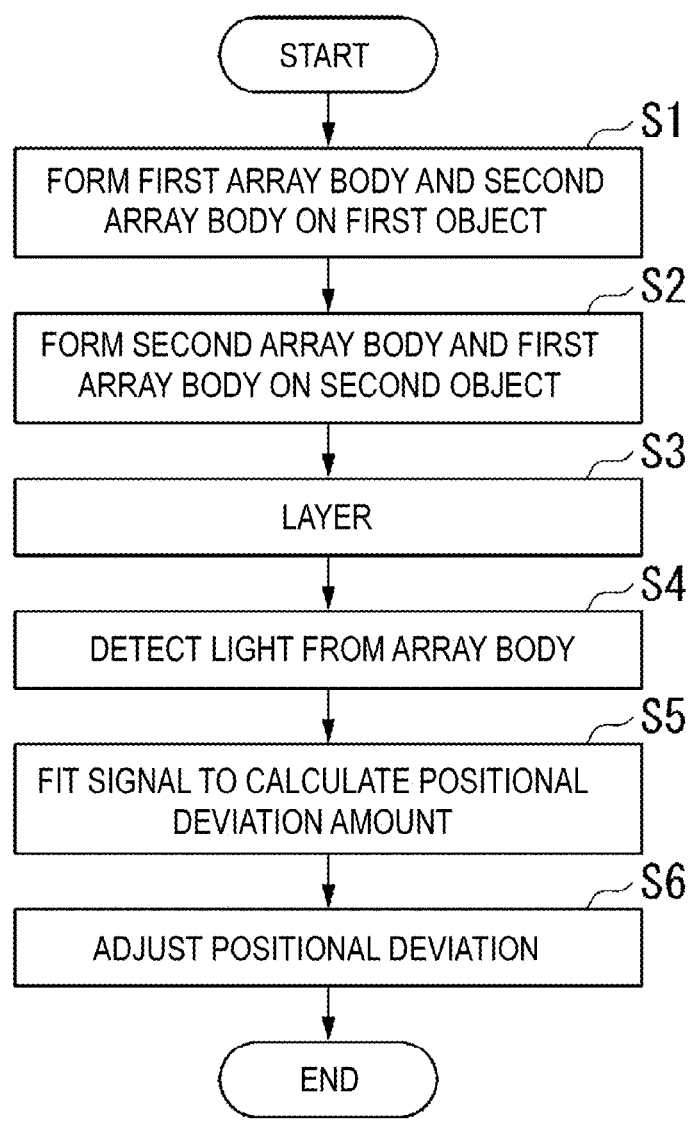
FIG. 9 is a flowchart of a detection and adjustment procedure example for a positional deviation amount according to the embodiment.

FIG. 9 is a flowchart of a detection and adjustment procedure example of the positional deviation amount according to the present embodiment.

(Step S1) The positioning device 1 forms the first array body 311 (21) and the second array body 312 (21) on the first object (mold 21).

(Step S2) The positioning device 1 forms the second array body 312 (22) and the first array body 311 (22) on the second object (substrate 22).

The processing in steps S1 and S2 may be performed by, for example, another device such as a photolithography device or an electron beam lithography device.

(Step S3) The positioning device 1 layers the first object and the second object.

(Step S4) The positioning device 1 detects the light signal from the array body.

(Step S5) The positioning device 1 fits the light intensity of the detected light signal to calculate the positional deviation amount between the first object and the second object.

(Step S6) The positioning device 1 adjusts positions of the first object and the second object based on the calculated positional deviation amount.

Here, an example of an equation used for fitting will be described.

First, a general formula of a light intensity I in a case of one array body can be expressed by the following Equation (1).

[Math 1]

$$I = a \cos \left\{ \frac{2\pi(x - dx)}{p} \right\} + b \quad (1)$$

In the Equation (1), x is a position of the detection pixel in the x axis, x=0 is an origin, dx is a positional deviation amount from the origin, a is an amplitude, b is a light intensity of a background, and p is a period (interval) of bars constituting the array body. A case of dx=0 indicates that there is no positional deviation.

Next, an equation used for fitting in a case of four independent array bodies as shown in, for example, FIGS. 4 and 5 can be expressed by the following Equation (2).

[Math 2]

$$I_i = a_i \cos \left\{ \frac{2\pi(x - dx_i)}{p_i \times q} \right\} + b_1 \quad (2)$$

In the Equation (2), i indicates each array body, and q is a correction multiple that depends on an imaging system. An origin position is set in advance, and $a_i$, $b_i$, q, and $dx_i$ are calculated by fitting.

Conditions in the equation of the light intensity generated from the four independent array bodies i of 1 to 4 are as follows.

(Condition 1) The array bodies (i=1, 3) are formed on an upper mold 21, and the array bodies (i=2, 4) are formed on a lower substrate 22.

(Condition 2) When imaging from the mold 21 side, the array bodies i=1 and 2 and i=3 and 4 are adjacent to each other.

(Condition 3) A positional deviation amount d in superposition of the substrate 22 on the mold 21 is $d=dx_2-dx_1=dx_4-dx_3$ (where d>0 (when the substrate deviates to a left side), d<0 (when the substrate deviates to a right side), $|d|<p_1/2$, $p_1=p_4$, and $p_2=p_3$).

In the Equation (2), positional deviation amount $dx_1$=positional deviation ideal value $d_{real}$+error Δd, standard error=standard deviation σ of fitting residual, and the fitting residual is a difference between a fitting equation and observation data.

In the examples in FIGS. 4 and 5, i=1 is the first array body 311 (21) of the first object (mold 21), i=3 is the second array body 312 (21) of the first object, i=2 is the second array body 312 (22) of the second object (substrate 22), and i=4 is the first array body 311 (22) of the second object. In addition, the period $p_1$ of the first array body of the first object is equal to the period $p_4$ of the first array body of the second object, and the period $p_2$ of the second array body of the first object is equal to the period $p_3$ of the second array body of the second object. Further, the positional deviation amount $dx_1$ of the first array body and the positional deviation amount $dx_3$ of the second array body in the first object are equal to each other since the first array body and the second array body are formed on the same object, and the positional deviation amount $dx_2$ of the second array body and the positional deviation amount $dx_4$ of the first array body in the second object are equal to each other since the second array body and the first array body are formed on the same object.

The positional deviation amount (detection value) d between the mold 21 and the substrate 22 can be derived by the following Equation (3).

[Math 3]

$$d = \frac{dx_1 - dx_2 + dx_3 - dx_4}{2} \quad (3)$$

<Verification Results>

Next, a result example of verification for the method according to the present embodiment will be described.

First, results of verification of the resolution of the light intensity will be described. FIG. 10 is a diagram showing detection values and standard errors when the resolution of the light intensity is 256 gradations of 8 bits and analysis periods are 5 periods, 10 periods, 20 periods, 50 periods, 100 periods, and 120 periods. Verification conditions in FIG. 10 are four columns of the first array body 311 (21), the second array body 312 (22), the second array body 312 (21), and the first array body 311 (22), the period $p_1$ of the first array body 311 is 8.0 (μm), the width $L_1$ of the bar 300 in the lateral direction is 4.0 (μm), the space width $S_1$ is 4.0 (μm), the period $p_2$ of the second array body 312 is 8.1 (μm), the width $L_2$ of the bar 300 in the lateral direction is 4.0 (μm), the space width $S_2$ is 4.1 (μm), and the pixel length detected during imaging is 1 (μm)/pixel (px). A case in which the analysis period is 5 periods means a result of analyzing the length 40 (μm) at which the period $p_1$ corresponds to 5 periods. Here, light having lengths corresponding to 5 periods, 10 periods, 20 periods, 50 periods, 100 periods, and 120 periods is detected from array bodies of four columns, and a signal is fitted by the Equation (2) to analyze the positional deviation amount (detection value) and the standard error. The magnification of the optical system is seven times. In addition, in the table, the left is the detection value (nm), and the right is the standard error (nm).

Further, in FIG. 10, "set displacement" is a deviation amount by which the mold 21 and the substrate 22 are intentionally deviated for verification.

As shown in FIG. 10, when the resolution of the light intensity is 8 bits, by analyzing the length 400 (μm) corresponding to 50 periods, the positional deviation amount between the mold 21 and the substrate 22 can be detected with a standard error of 1 (nm) scale in any of 0 (nm) to 100 (nm).

FIGS. 11 and 12 are diagrams showing detection values and standard errors when the resolution of the light intensity is 4096 gradations of 12 bits and the analysis periods are 5 periods, 10 periods, 20 periods, 30 periods, periods, 50 periods, 100 periods, and 120 periods. The verification conditions in FIGS. 11 and 12 are the same as those in FIG. 10 except that the resolution of the light intensity is 12 bits.

As shown in FIGS. 11 and 12, when the resolution of the light intensity is 12 bits, the accuracy can be greatly improved as compared with the resolution of 8 bits. For example, in a case of 50 periods (length 400 (μm)), the positional deviation amount between the mold 21 and the substrate 22 can be detected with a standard error of 0.26 (nm) scale in any of 0 (nm) to 100 (nm). In a case of 10 periods (length 80 (μm)), the positional deviation amount between the mold 21 and the substrate 22 can be detected with a standard error of 0.76 (nm) scale in any of 0 (nm) to 100 (nm). In a case of 20 periods (length 160 (μm)), the positional deviation amount between the mold 21 and the substrate 22 can be detected with a standard error of a detection value of 0.5 (nm) scale of an atomic scale.

According to the present embodiment, since the size itself of the imaging element can be reduced when the period necessary for the analysis is reduced, a cost of the positional deviation amount detection can be reduced.

It is needless to say that, by detecting with the resolution of the light intensity of, for example, 16384 gradations of 14 bits, which is larger than 12 bits, the positional deviation amount of the atomic scale can be detected even when the analysis period is made small.

A relationship among the resolution of the light intensity, the analysis period, and the detection value will be further described with reference to FIGS. 10 to 13.

Figure 13:
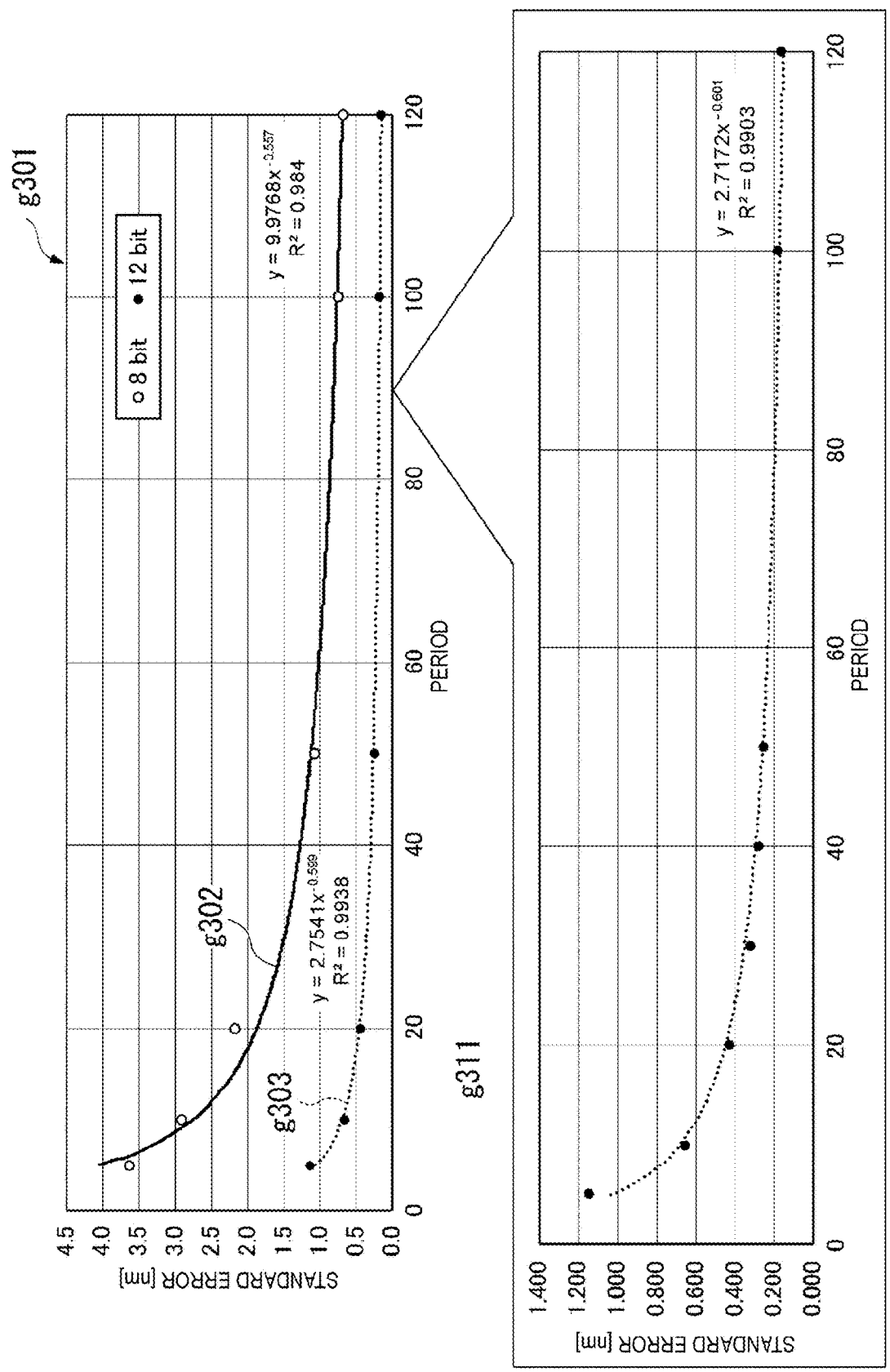
FIG. 13 is a diagram showing a relationship among the resolution of the light intensity, the analysis period, and the detection value.

FIG. 13 is a diagram showing the relationship among the resolution of the light intensity, the analysis period, and the detection value. In FIG. 13, a horizontal axis represents the period (the number of periods $p_1$), and a vertical axis represents the standard error (nm). The period $p_1$ is 8.0 (μm). A graph g301 is a graph showing the relationship between the analysis periods having the resolution of the light intensity of 8 bits and 12 bits and the standard error. In addition, in the graph g301, a chain line g302 is a standard error for the analysis period having the resolution of the light intensity of 8 bits, and a chain line g303 is a standard error for the analysis period having the resolution of the light intensity of 12 bits. Further, a graph g311 is a graph in which a scale of the vertical axis of the standard error with respect to the analysis period having the resolution of the light intensity of 12 bits is changed.

As shown in FIGS. 10 to 13, the analysis period necessary to obtain the standard error 1 (nm) is about 50 periods (about length 400 (μm)) when the resolution of the light intensity is 8 bits, and is about 10 periods (about length 80 (μm)) when the resolution of the light intensity is 12 bits. When the resolution of the light intensity is 12 bits, the accuracy of 1.4 (nm) or less can be obtained even at 5 periods (length 40 (μm)). For example, in the case of 50 periods, although the standard error of the resolution of the light intensity of 8 bits is about 1 (nm), the standard error of the resolution of the light intensity of 12 bits is reduced to about 0.25 (nm).

Further, in order to perform the positioning with accuracy of about 1 (nm), it is necessary that the standard error is about 0.3 (nm). In the present embodiment, as the resolution of the light intensity is increased, the positioning can be performed with high accuracy for a positional deviation amount of about 1 (nm) even in a smaller analysis period.

According to the present embodiment, an effect can be attained that the length (analysis period) of the array body formed on the mold 21 and the substrate 22 can be reduced, that is, an alignment mark for positioning provided on the mold 21 and the substrate 22 can be reduced.

Next, a result of verification of dependency of the pixel length (resolution) detected during imaging on the detection value of the positional deviation amount between the mold 21 and the substrate 22 will be described.

FIG. 14 is a diagram showing a result of verification of the dependency of the resolution on the detection value and the standard error of the positional deviation amount. Verification conditions are four columns of the first array body 311 (21), the second array body 312 (22), the second array body 312 (21), and the first array body 311 (22), the period $p_1$ of the first array body 311 is 8.0 (μm), the width $L_1$ of the bar 300 in the lateral direction is 4.0 (μm), the space width $S_1$ is 4.0 (μm), the period $p_2$ of the second array body 312 is 8.1 (μm), the width $L_2$ of the bar 300 in the lateral direction is 4.0 (μm), the space width $S_2$ is 4.1 (μm), and the pixel length detected during imaging is 1 (μm)/pixel (px). In addition, the set displacement is 1 (nm), 2 (nm), and 5 (nm) from the top. In the table, the left is the detection value (nm), and the right is the standard error (nm). A case in which the analysis period is 5 periods means a result of analyzing the length 40 (μm) at which the period $p_1$ corresponds to 5 periods. In addition, the verified resolution (pixel (px)/μm) is 0.5, 0.75, 1, and 1.25. The resolution of the light intensity is 4096 gradations of 12 bits.

As shown in FIG. 14, in any period, the larger the resolution is, that is, the larger the number of the pixels (px) per 1 (μm) is, the smaller the standard error of the detection value is, and the positioning accuracy is improved.

In order to obtain desired positioning accuracy, for example, in the detection in which the period $p_1$ is 8.0 (μm), 5 periods (50 pixels) or more are desirable for a resolution of 1.25 pixel/μm, 10 periods (80 pixels) or more are desirable for a resolution of 1 pixel/μm, 20 periods (120 pixels) or more are desirable for a resolution of 0.75 pixel/μm, and 20 periods (320 pixels) or more are desirable for a resolution of 0.5 pixel/μm.

Next, a result of verification of the width (width of bar) L (Line) of the bar 300 of the array body in the lateral direction, the space width S (Space) between the bars, and the detection accuracy of the detection value and the standard error at a set displacement of 5 (nm) will be described with reference to FIGS. 15 to 17.

Figure 15:
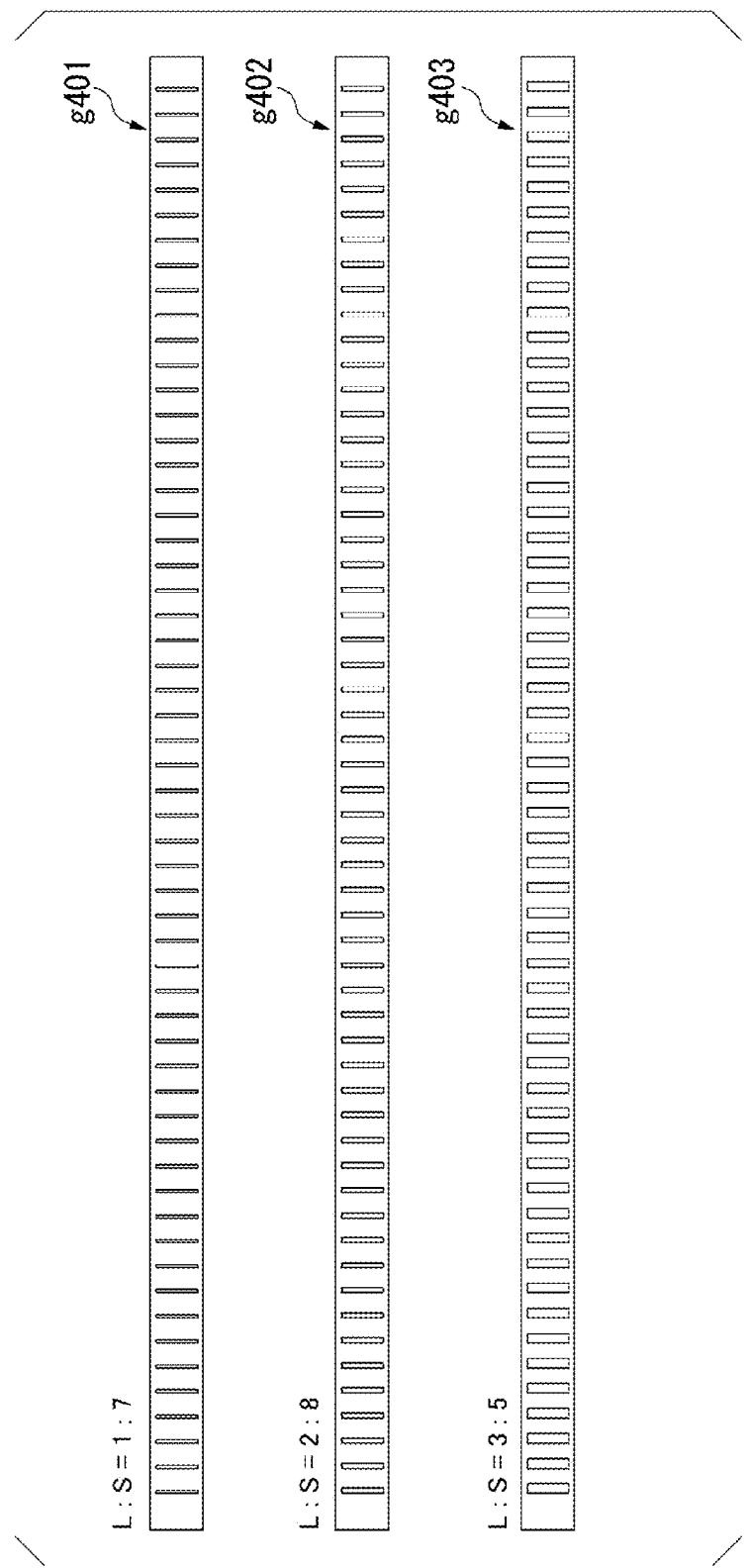
FIG. 15 is a diagram showing an example of a width L of the bar of the array body used for verification in a lateral direction and a space width S between the bars.

FIG. 15 is a diagram showing an example of the width L of the bar of the array body having the period $p_1$=8.0 (μm) used for verification and the space width S. As shown in FIG. 15, in the verification, a ratio of L:S is 1:7 (g401), 2:6 (g402), and 3:5 (g403), for example. That is, in 1:7 (g401), L is 1 (μm) and S is 7 (μm). In 2:6 (g402), L is 2 (μm) and S is 6 (μm). In 3:5 (g403), L is 3 (μm) and S is 5 (μm).

Figures 16, 17:
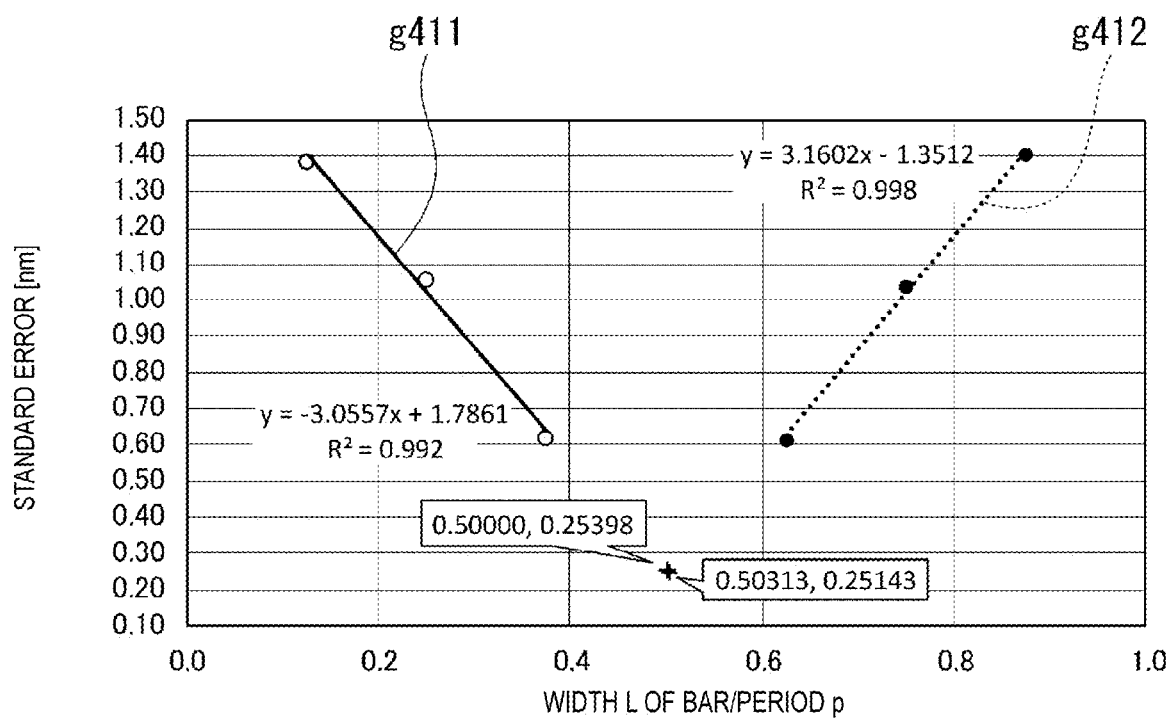
FIG. 16 is a diagram showing an example of a ratio between the width L of the bar of the array body and the space width S between the bars, the detection value, and the standard error.
FIG. 17 is a diagram showing a relationship between the width of the bar/period and the standard error.

FIG. 16 is a diagram showing an example of the ratio between the width L of the bar of the array body and the space width S, the detection value (nm), and the standard error (nm). When the period $p_1$ is 8.0 (μm), in a width ratio of L:S of 3:5, it can be seen that the set displacement 5 (nm) can be detected with a detection value of 4.947 (nm) and a standard error of 0.620 (nm), in a width ratio of L:S of 4:4, it can be seen that the set displacement 5 (nm) can be detected with a detection value of 5.049 (nm) and a standard error of 0.254 (nm), and in a width ratio of L:S of 5:3, it can be seen that the set displacement 5 (nm) can be detected with a detection value of 5.087 (nm) and a standard error of 0.614 (nm). Therefore, it is desirable that the width L of the bar of the array body and the length of the space width S are substantially equal to each other because the standard error is small.

FIG. 17 is a diagram showing a relationship between the width L (Line Width) of the bar/period p (period) of the array body and the standard error. A chain line g411 has a width of the bar/period of 0 to 0.5, and a chain line g412 has a width of the bar/period of 0.5 to 1.0.

As shown in FIGS. 16 and 17, when L:S is 1:1 and the width of the bar/period is 0.5, it can be seen that the standard error is small and the detection accuracy is high. In addition, when the ratio of L:S is 4.025:3.975 and the width L of the bar/period p of the array body is 0.50313, the standard error is 0.25243 (nm), and the detection accuracy is the highest.

As described above, in the present embodiment, the array body on the mold 21 side and the array body on a substrate 22 side do not overlap when layered. In addition, in the present embodiment, the first array body and the second array body do not overlap. Further, in the present embodiment, the first array body and the second array body are arranged on the mold 21 side, and the second array body and the first array body are arranged on the substrate 22 side. In the present embodiment, the resolution of the light intensity is, for example, 4096 gradations of 12 bits.

Accordingly, according to the present embodiment, a positioning method, a method for manufacturing a layered body, a positioning device, a layered body manufacturing device, and a layered body that can perform the positioning between an upper object and a lower object with accuracy of an atomic scale error can be provided.

According to the present embodiment, since the optical system can be implemented at a lower magnification than that in the related art, the cost of the device can be reduced. Further, according to the present embodiment, the array body formed on the layered object can be made smaller than that in the related art.

MODIFICATION

In the above-described embodiment, the example of the array body in which the bars are periodically arranged in the x axis direction has been described, and the invention is not limited thereto.

First Modification

Figure 18:
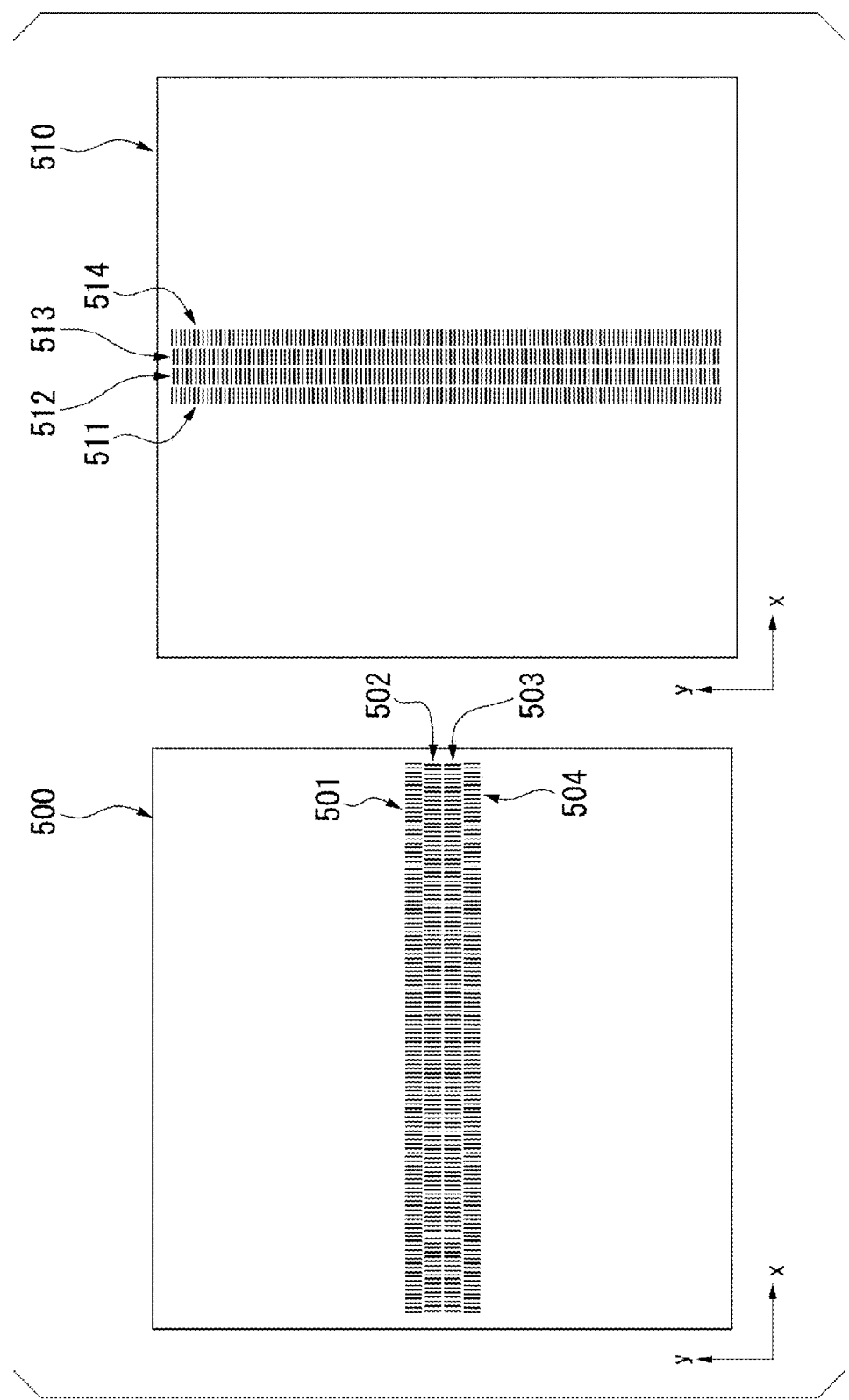
FIG. 18 is a diagram showing an example in which an x axis direction adjustment array body and a y axis direction adjustment array body are independent.

FIG. 18 is a diagram showing an example in which an x axis direction adjustment array body and a y axis direction adjustment array body are independent. FIG. 18 shows an arrangement example of eight independent array bodies obtained when imaging from the mold 21 side.

An array body arrangement example 500 is an arrangement example of four x axis direction adjustment array bodies. In the array body arrangement example 500, for example, a first array body 501 and a second array body 503 are formed on the mold 21, and a second array body 502 and a first array body 504 are formed on the substrate 22. In addition, in the array body arrangement example 500, the array bodies do not overlap in an order of the array bodies 501 to 504 in the y axis direction when layered.

An array body arrangement example 510 is an arrangement example of four y axis direction adjustment array bodies. In the array body arrangement example 510, for example, a first array body 511 and a second array body 513 are formed on the mold 21, and a second array body 512 and a first array body 514 are formed on the substrate 22. In addition, in the array body arrangement example 510, the array bodies do not overlap in an order of the array bodies 511 to 514 in the y axis direction when layered.

Second Modification

Figure 19:
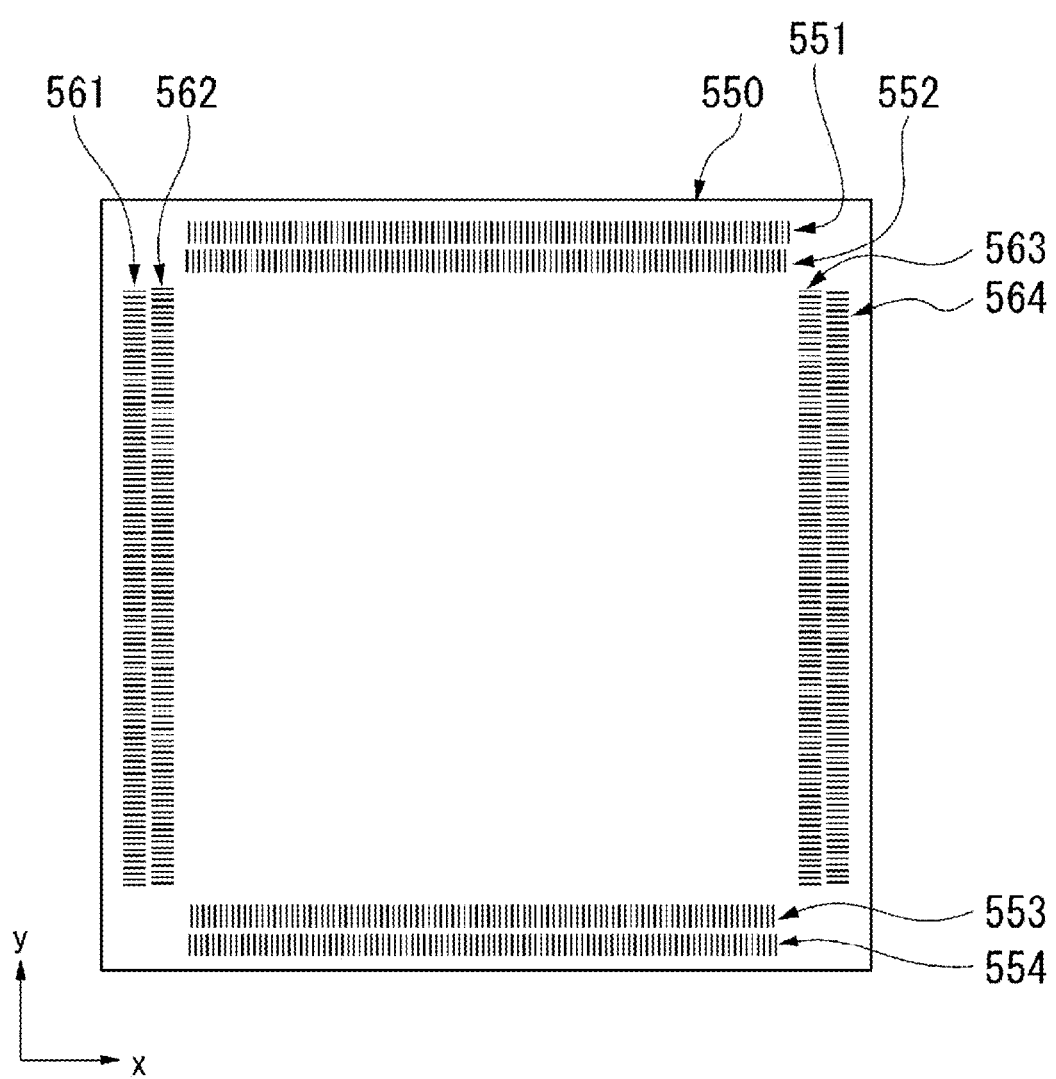
FIG. 19 is a diagram showing an example in which the array body is divided vertically and horizontally in each direction.

FIG. 19 is a diagram showing an example in which the array body is divided vertically and horizontally in each direction.

In an array body arrangement example 550, regarding the x axis direction adjustment array bodies, for example, a first array body 551 is formed on an upper side of the mold 21, a second array body 553 is formed on a lower side of the mold 21, a second array body 552 is formed on an upper side of the substrate 22, and a first array body 554 is formed on a lower side of the substrate 22. In addition, in the array body arrangement example 550, the array bodies do not overlap in an order of the array bodies 551 to 554 in the y axis direction when layered.

In the array body arrangement example 550, regarding the y axis direction adjustment array bodies, for example, a first array body 561 is formed on a left side of the mold 21, a second array body 563 is formed on a right side of the mold 21, a second array body 562 is formed on a left side of the substrate 22, and a first array body 564 is formed on a right side of the substrate 22. In addition, in the array body arrangement example 550, the array bodies do not overlap in an order of the array bodies 561 to 564 in the x axis direction when layered.

As shown in FIG. 19, for example, the x axis may be about 500 (μm), and the y axis may be about 500 (μm). In addition, for example, when the size of the mold is 10 (mm) in the x axis and 10 (mm) in the y axis, the array bodies may be arranged on the upper side and the lower side of the entire mold. In this case, it is desirable that the array bodies 551 and 552, the array bodies 553 and 554, the array bodies 561 and 562, and the array bodies 563 and 564 are paired.

Third Modification

Figure 20:
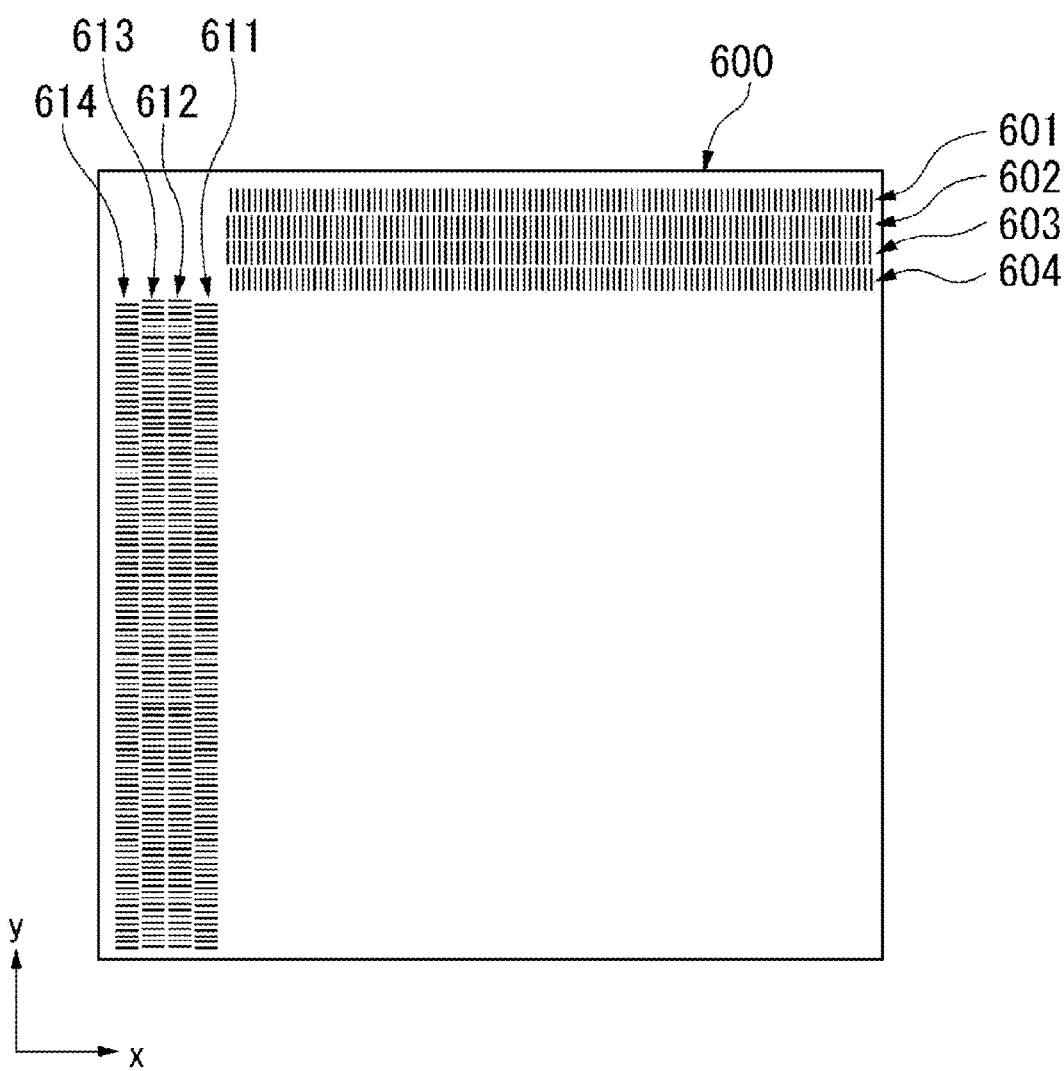
FIG. 20 is a diagram showing an example in which the array bodies are arranged in an L shape.

FIG. 20 is a diagram showing an example in which the array bodies are arranged in an L shape.

In an array body arrangement example 600, regarding the x axis direction adjustment array bodies, for example, a first array body 601 and a second array body 603 are formed on an upper side of the mold 21, and a second array body 602 and a first array body 604 are formed on an upper side of the substrate 22. In addition, in the array body arrangement example 600, the array bodies do not overlap in an order of the array bodies 601 to 604 in the y axis direction when layered.

In the array body arrangement example 600, regarding the y axis direction adjustment array bodies, for example, a first array body 611 and a second array body 613 are formed on a left side of the mold 21, and a second array body 612 and a first array body 614 are formed on the upper side of the substrate 22. In addition, in the array body arrangement example 600, the array bodies do not overlap in an order of the array bodies 611 to 614 in the x axis direction when layered.

In the case in FIG. 20, eight x axis and y axis array bodies can be arranged at positions corresponding to two opposing corners of the mold 21 to detect a light signal from the array body.

Fourth Modification

Figure 21:
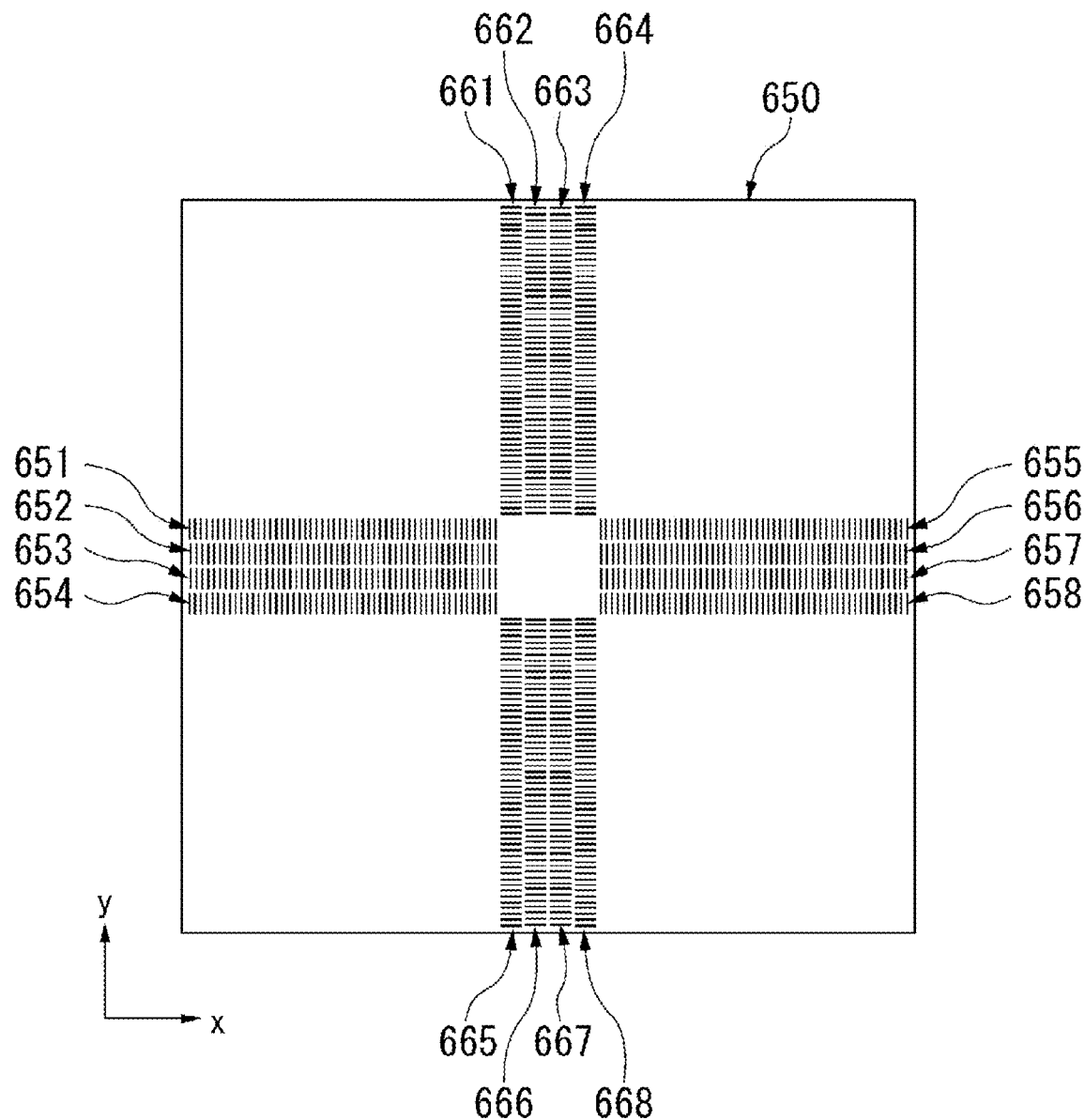
FIG. 21 is a diagram showing an example in which the array bodies are arranged in a cross shape.

FIG. 21 is a diagram showing an example in which the array bodies are arranged in a cross shape.

In an array body arrangement example 650, regarding the x axis direction adjustment array bodies, for example, a first array body 651 and a second array body 653 are formed on a left side of the mold 21, a first array body 655 and a second array body 657 are formed on a right side of the mold 21, a second array body 652 and a first array body 654 are formed on a left side of the substrate 22, and a second array body 656 and a first array body 658 are formed on a right side of the substrate 22. In addition, in the array body arrangement example 650, the array bodies do not overlap in an order of the array bodies 651 to 654 and an order of the array bodies 655 to 658 in the y axis direction when layered.

In the array body arrangement example 650, regarding the y axis direction adjustment array bodies, for example, a first array body 661 and a second array body 663 are formed on an upper side of the mold 21, a first array body 665 and a second array body 667 are formed on a lower side of the mold 21, a second array body 662 and a first array body 664 are formed on an upper side of the substrate 22, and a second array body 666 and a first array body 668 are formed on a lower side of the substrate 22. In addition, in the array body arrangement example 650, the array bodies do not overlap in an order of the array bodies 661 to 664 and an order of the array bodies 665 to 668 in the x axis direction when layered.

In this way, the arrangement of the array bodies may be hollow in a central portion or the like.

In the case in FIG. 21, the array bodies can be arranged on four corners of the mold 21 and the substrate 22, on vicinities of four sides of the mold 21 and the substrate 22, on a center of the mold 21 and the substrate 22, or the like according to a circuit pattern for a device.

The arrangement examples of the array bodies shown in FIGS. 18 to 21 are merely examples, and the invention is not limited thereto.

Fifth Modification

In the above-described embodiment and modifications, the example has been described in which the period $p_2$ of the second array body is greater than the period $p_1$ of the first array body, and the invention is not limited thereto.

Figure 23:
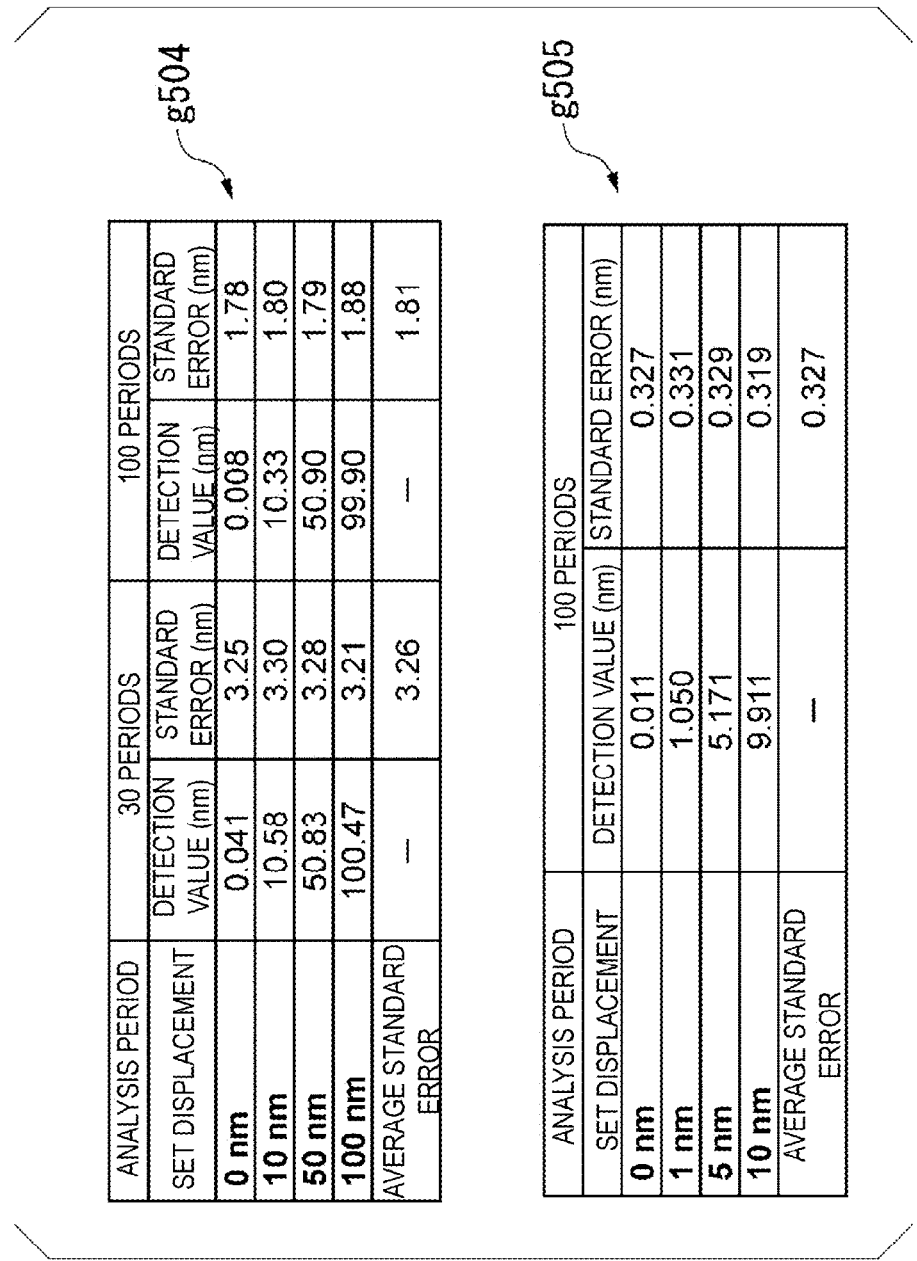
FIG. 23 is a diagram showing a result example of verification of the period of the array body.

FIGS. 22 and 23 are diagrams showing result examples of verification of the period of the array body. A column represents average values of intentionally deviated amounts and standard errors, and a row represents detection values (nm) and standard errors (nm) for each combination of the periods.

In a first example shown in a table g501 in FIG. 22, the period $p_1$ of the first array body described so far is 8.0 (μm), the period $p_2$ of the second array body is 8.1 (μm), and the optical system is one pixel (px)=1 (μm). In the first example, 30 periods (four columns) and 100 periods (four columns) are verified. The four columns are, for example, a state in which four columns of the array bodies are arranged in an axial direction as shown in FIG. 18.

In a second example shown in a table g502 in FIG. 22, the period $p_1$ of the first array body is 8.00 (μm), the period $p_2$ of the second array body is 8.01 (μm), and the optical system is one pixel (px)=1 (μm). The second example is the same as the first example except that the period $p_2$ is 8.01 (μm), the width $L_2$ of the bar is 4.00 (μm), and the space width $S_2$ is 4.01 (μm). In the second example, periods (four columns) and 100 periods (four columns) are verified.

In a third example shown in a table g503 in FIG. 22, the period $p_1$ of the first array body is 8.0 (μm), the period $p_2$ of the second array body is 8.8 (μm), and the optical system is one pixel (px)=1 (μm). The third example is the same as the first example except that the period $p_2$ is 8.8 (μm), the width $L_2$ of the bar is 4.0 (μm), and the space width $S_2$ is 4.8 (μm). In the third example, 30 periods (four columns) and 100 periods (four columns) are verified.

In a fourth example shown in a table g504 in FIG. 23, the period $p_1$ of the first array body is 80 (μm), the period $p_2$ of the second array body is 81 (μm), and the optical system is one pixel (px)=10 (μm). In the fourth example, the period $p_1$ is 80 (μm), the width $L_1$ of the bar is 40 (μm), the space width $S_1$ is 40 (μm), the period $p_2$ is 88 (μm), the width $L_2$ of the bar is 40 (μm), and the space width $S_2$ is 48 (μm). In the fourth example, 30 periods and 100 periods are verified. It can be seen that, even when a CCD unique pixel pitch is 70 (μm) at an observation magnification of 7 times, a standard error 3.3 (nm) is detection accuracy of the positional deviation amount at 30 periods. In addition, even in a case of a reduction optical system having an observation magnification of 0.7 times, when the CCD unique pixel pitch is 7 (μm), it can be seen that the positional deviation amount can be detected with an average standard error 3.26 (nm) at 30 periods and with an average standard error 1.81 (nm) at 100 periods.

In a fifth example shown in a table g505 in FIG. 23, the period $p_1$ of the first array body is 8.00 (μm), the period $p_2$ of the second array body is 8.00 (μm), and the optical system is one pixel (px)=1 (μm). In the fifth example, 60 periods (two columns) are verified. In the fifth example, for example, as shown in an upper side of FIG. 19, only two columns of array bodies are arranged.

As shown in verification results in FIGS. 22 and 23, the period is not limited to $p_1 < p_2$, and the positional deviation amount can be detected with desired accuracy even when $p_1 = p_2$.

As shown in FIGS. 22 and 23, when the number of patterns is large (=the number of the periods is large) (for example, 100 periods), as in the fifth example, the accuracy can be guaranteed even when the number of the array bodies is one on the mold 21 side and one on the substrate 22 side. Therefore, even when two array bodies are provided on the mold 21 side and two array bodies are provided on the substrate 22 side, it is sufficient that neither the first array body nor the second array body provided on the mold 21 overlaps the second array body or the first array body provided on the substrate 22 when the mold 21 and the substrate 22 are layered.

Further, as in the fourth example, even if the optical system is 0.7 times the optical system (1 pixel≈10 μm), the positioning can be performed with a standard error of about 3 (nm).

That is, according to the present embodiment, not only by the optical system having the low magnification of the microscope that enlarges an image, but also by an optical system that reduces the image, and even by an optical system having a constant magnification, the positional deviation amount can be detected with higher accuracy than that in the related art and the positioning can be performed.

<Effect of Presence of Residual Film>

Next, a result of verification of an influence of presence of a residual film of the layer 23 when the fluorescence, which is an example of the luminescence, is detected from the mold 21 and the substrate 22 will be described. The residual film is the layer 23 to which the ultraviolet curable visible fluorescent liquid is applied, and a thickness (RLT: residual layer thickness) of the residual film is a thickness of the layer 23. When the ultraviolet curable visible fluorescent liquid is cured by ultraviolet irradiation and used as a resist mask in photo-nanoimprint lithography, it is desirable that the thickness of the residual film is small in order to bring a shape of the mask close to a shape of a transfer object. Since the array bodies of the bars 300 arranged on the mold 21 and the substrate 22 have a concave structure and the concave structure is filled with the ultraviolet curable fluorescent liquid, a signal with a larger light intensity from the array bodies of the bars 300 of the mold 21 and the substrate 22 is detected from the fluorescence detected from the layer 23. That is, when the thickness of the layer 23 corresponding to the thickness of the residual film is large, a signal intensity from the alignment mark becomes small, and it becomes difficult to detect the fluorescence contributing to the positioning.

As verification conditions, the resolution of the light intensity is 4096 gradations of 12 bits, the resolution is 1 pixel (px)=1 (μm), the set displacement of the substrate 22 from the mold 21 is 5 (nm), the period $p_1$ is 8.0 (μm) (the width $L_1$ of the bar is 4.0 (μm), and the space width $S_1$ is 4.0 (μm)), the period $p_2$ is 8.1 (μm) (the width $L_2$ of the bar is 4.0 (μm), and the space width $S_2$ is 4.1 (μm)), and the analysis period is 30 periods (four columns). A depth (pattern depth) of the concave structure of the bar array bodies arranged on the mold 21 and the substrate 22 is set to 0.1 (μm).

Figures 24, 25:
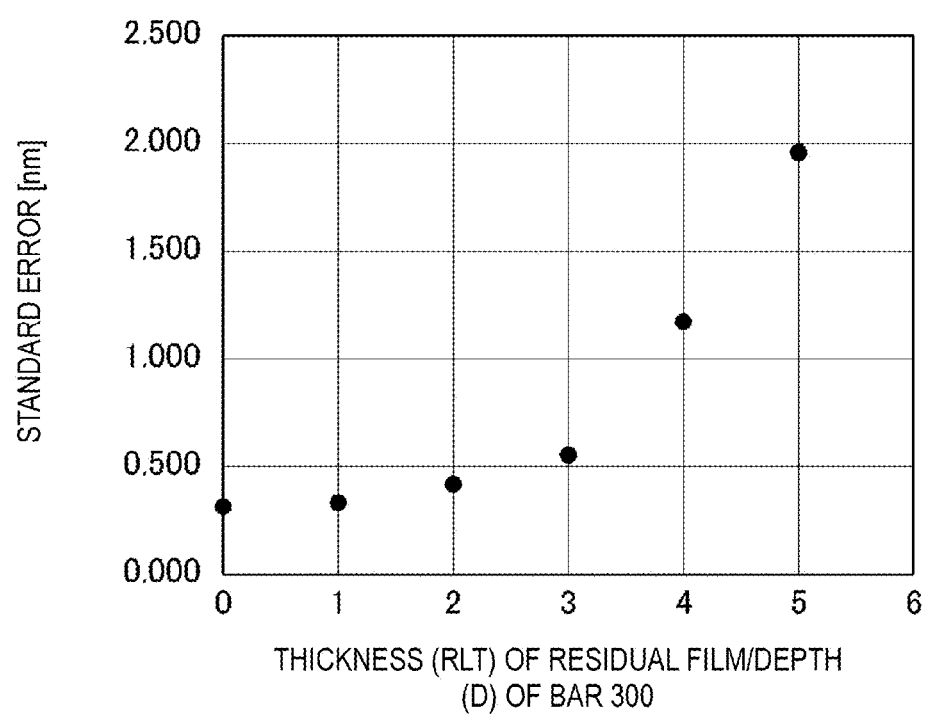
FIG. 24 is a diagram showing a result of verification of the number of effective gradations that can be used for detection of the positional deviation amount among the detection value, the standard error, and the resolution of the light intensity of 4096 gradations of 12 bits for each ratio of a thickness of a residual film to a pattern depth of a bar array body.
FIG. 25 is a graph of FIG. 22 showing a relationship between the ratio of the thickness of the residual film to the pattern depth of the bar array body and a standard error of the detection value.

FIG. 24 is a diagram showing a result of verification of the number of effective gradations that can be used for detection of the positional deviation amount among the detection value (nm), the standard error (nm), and the resolution of the light intensity of 4096 gradations of 12 bits for each ratio (RLT/D) of the thickness (RLT: residual layer thickness) of the residual film to the pattern depth (D) of the bar array body. FIG. 25 is a graph of FIG. 24 showing a relationship between the ratio of the thickness (RLT) of the residual film to the pattern depth (D) of the bar array body and a standard error of the detection value. In FIG. 25, a horizontal axis represents the ratio (RLT/D) of the thickness of the residual film to the pattern depth of the bar array body, that is, the thickness (RLT) of the residual film/the depth (D) of the bar 300, and a vertical axis represents the standard error (nm). Since the pattern depth of the bar array body is 0.1 (μm), 1, 2, 3, 4, and 5 on the horizontal axis correspond to the thickness 0.1 (μm), 0.2 (μm), 0.3 (μm), 0.4 (μm), and 0.5 (μm) of the residual film, respectively.

As shown in FIG. 25, as the thickness of the residual film of the layer 23 increases, the standard error increases. The standard error when the ratio (RLT/D) of the thickness of the residual film to the pattern depth of the bar array body is 0 or 1 is about 0.3 (nm), the standard error when the thickness of the residual film is 2 is about 0.4 (nm), and the standard error when the thickness RLT of the residual film is 3 is about 0.6 (nm). When performing the positioning by detecting the luminescence such as fluorescence as a light signal, the smaller the thickness of the residual film is, the more accurate the detection value and the standard error of the positional deviation amount between the mold 21 and the substrate 22 can be. By increasing the pattern depth of the bar array bodies arranged on the mold 21 and the substrate 22, the thickness of the residual film that can be positioned can be increased. When the pattern depth is 1 (μm), the positioning can be accurately performed even when the thickness of the layer 23 corresponding to the thickness of the residual film, that is, a distance between the mold 21 and the substrate 22 is 3 (μm).

The case has been described above in which the luminescence is detected as a light signal. When the scattered light from the alignment mark provided on the mold 21 and the substrate 22 is detected as a light signal, since the layer 23 is a gas such as air, the dependency of the layer 23 on the distance between the mold 21 and the substrate 22 is reduced. When the distance between the mold 21 and the substrate 22 increases, an optical system for increasing a focus depth of light to be detected is required.

Figure 26:
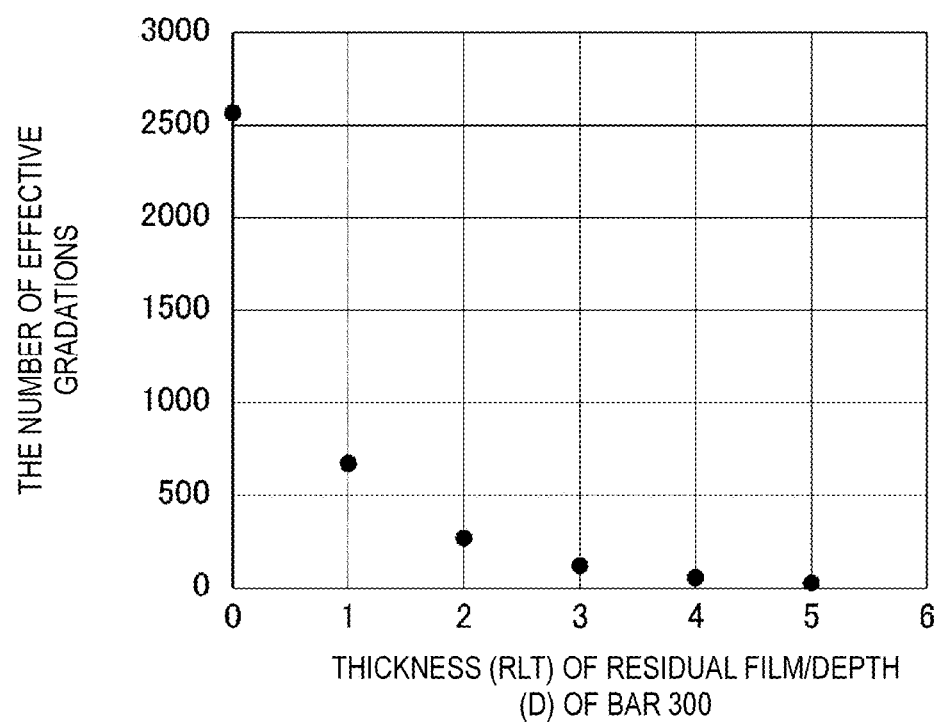
FIG. 26 is a graph of FIG. 22 showing a relationship between the ratio of the thickness of the residual film to the pattern depth of the bar array body and the number of effective gradations that can be used for detection of the positional deviation amount among the resolution of the light intensity of 4096 gradations of 12 bits.

FIG. 26 is a graph of FIG. 22 showing a relationship between the ratio (RLT/D) of the thickness of the residual film (RLT) to the pattern depth (D) of the bar array body and the number of effective gradations that can be used for detection of the positional deviation amount among the resolution of the light intensity of 4096 gradations of 12 bits. In FIG. 26, a horizontal axis represents the ratio (RLT/D) of the thickness of the residual film to the pattern depth of the bar array body, and a vertical axis represents the number of effective gradations that can be used for detection of the positional deviation amount among the resolution of the light intensity of 4096 gradations of 12 bits.

As shown in FIG. 26, the number of effective gradations decreases as the ratio (RLT/D) of the thickness of the residual film to the pattern depth increases. The number of effective gradations when the ratio of the thickness of the residual film to the pattern depth is 0 is about 2600, the number of effective gradations when the ratio of the thickness of the residual film to the pattern depth is 1 is about 700, and the number of effective gradations when the ratio of the thickness of the residual film to the pattern depth is 2 is about 250. In the case of resolution of the light intensity of 12 bits, as the ratio of the thickness of the residual film to the pattern depth increases, the standard error of the detection value of the positional deviation amount increases. In such a case, the positional deviation amount can be accurately detected using an imaging element having a resolution of a light intensity of 14 bits.

In the above-described embodiment and modifications, an example has been described in which the number of the array bodies is two or four. Alternatively, the number of the array bodies may be six or more.

In contrast to the present embodiment as described above, in the positioning in the related art, for example, alignment marks having different periods are formed on the mold side and the substrate side, the alignment marks face each other and overlap when layered to generate a moire fringe, and the positioning is performed based on the moire fringe. In such a method in the related art, a period of the generated moire fringe is larger than the period of the array body of the alignment mark, and as a result, there is a problem that an observation field of view for detecting the positional deviation becomes large. Since an imaging field of view is small and an analysis period of the moire is reduced, there is a problem that the error becomes large. Further, in the case in which the luminescence such as fluorescence is detected as a light signal, there is a problem that inclination of the residual film is likely to affect a signal intensity of the moire. In the present embodiment, since the alignment marks do not overlap when layered, it is possible to remove low-frequency noise based on unevenness of the thickness of the residual film due to the inclination of the residual film by Fourier transform, it is possible to analyze the period $p_1$ of the first array body and the period $p_2$ of the second array body, and it is not likely to be affected by the unevenness of the thickness of the residual film due to the inclination of the residual film and fluctuation of the thickness of the residual film.

In a positioning method in the related art in which diffracted light is detected as a light signal, which is different from the case of detecting the luminescence or the scattered light as a light signal in the present embodiment, there is a problem that it is likely to be affected by a shape of an edge of each bar of the bar array body constituting the alignment mark. Since Fresnel diffraction occurs at the edge of each bar by the diffracted light, a light intensity at the edge of each bar increases. In the luminescence such as fluorescence or light scattering of or the like according to the present embodiment, since the light intensity is the maximum at the central portion of each bar, it is not likely to be affected by the shape of the edge of each bar of the bar array body constituting the alignment mark, and an effect of facilitating measurement of the center position of the width of the bar can be attained. In addition, in the positioning method in the related art in which the diffracted light is detected as a light signal, an optical functional film such as a metal light shielding film or a high refractive index film is required for the mold. In the case of detecting the luminescence or the scattered light as a light signal in the present embodiment, there is a feature that an optical functional film is not necessary for the mold, and thus there is an effect that a manufacturing cost of the mold can be reduced.

In the related art, the first alignment mark is formed on the first object, the second alignment mark is formed on the second object, and the two objects face each other. In the related art, an imaging element performs imaging, and the positioning is performed using a deviation between a predetermined position of a first region and a first alignment mark and a deviation between a predetermined position of a second region and a second alignment mark. That is, in the related art as described above, the positioning is performed by adjusting an alignment mark formed on an object to a predetermined position.

On the other hand, in the present embodiment, the positional deviation amount between the array body formed on the first object and the array body formed on the second object is detected, and the positioning between the first object and the second object is performed by positioning between the array body formed on the first object and the array body formed on the second object based on the detected positional deviation amount. As a result, the effects described above can be attained.

All or a part of the processing performed by the control device 11 may be performed by recording a program for implementing all or a part of the functions of the control device 11 in the invention in a computer-readable recording medium and causing a computer system to read and execute the program recorded in the recording medium. Here, the "computer system" includes hardware such as an OS or a peripheral device. In addition, the "computer system" includes a WWW system having a homepage providing environment (or display environment). The "computer-readable recording medium" refers to a portable medium such as a flexible disk, a magneto-optical disk, a ROM, and a CD-ROM, and a storage device such as a hard disk built in the computer system. Further, the "computer-readable recording medium" includes a medium that maintains a program for a certain period of time, such as a volatile memory (RAM) inside a computer system serving as a server or a client when a program is transmitted via a network such as the Internet or a communication line such as a telephone line.

The program may be transmitted from a computer system in which the program is stored in a storage device or the like to another computer system via a transmission medium or by transmission waves in the transmission medium. Here, the "transmission medium" that transmits the program refers to a medium having a function of transmitting information, such as a network (communication network) such as the Internet or a communication line (communication line) such as a telephone line. In addition, the above program may be used to implement a part of the functions. Further, the above program may be a so-called differential file (differential program) that can implement the above functions in combination with a program already recorded in the computer system.

Although the aspect for carrying out the invention has been described using the embodiment, the invention is not limited to the embodiment, and various modifications and substitutions can be made without departing from the gist of the invention. For example, in the embodiment and the modifications, the positioning device (layered body manufacturing device) has been described using the imprint device in which the first object is the mold 21 and the second object is the substrate 22. The positioning method and positioning device (layered body manufacturing device) according to the present embodiment and modifications can be applied to positioning for various purposes, and the method for manufacturing a layered body and the positioning device (layered body manufacturing device) according to the present embodiment and modifications can be applied to positioning, layered body manufacturing, and the like for various applications in which the positioning is important.

REFERENCE SIGNS LIST

1: positioning device
11: control device
12: microscope device
13: ultraviolet irradiation device
14: fixed stage
15: coating device
16: XYZ θ axis movable stage
17: illumination device
21: mold
22: substrate
23: layer
311: first array body
312: second array body 400: light emitting body
450: imaging element
451: detection pixel

The invention claimed is:

1. A positioning method comprising:
a layering step of layering a first object and a second object;
a detection step of detecting, after the layering step, first light obtained from a first array body provided in the first object as a first signal, second light obtained from a second array body provided in the first object as a second signal, third light obtained from the second array body provided in the second object as a third signal, and fourth light obtained from the first array body provided in the second object as a fourth signal;
a calculating step of calculating positional deviation between the first object and the second object by respectively fitting the detected first signal, the detected second signal, the detected third signal, and the detected fourth signal; and
an adjustment step of adjusting the positional deviation, wherein
the first array body has a first periodic structure having a period $p_1$,
the second array body has a second periodic structure having a period $p_2$, and
neither the first array body nor the second array body provided in the first object overlaps the second array body or the first array body provided in the second object when the first object and the second object are layered.

2. The positioning method according to claim 1, wherein the first signal, the second signal, the third signal, and the fourth signal that are obtained from the first array body and the second array body are luminescence from a layer located between the first object and the second object.

3. The positioning method according to claim 1, wherein the first signal, the second signal, the third signal, and the fourth signal that are obtained from the first array body and the second array body are scattered light of the first array body and the second array body.

4. The positioning method according to claim 1, wherein in the layering step, the first object and the second object are layered such that a gap therebetween is 3 μm or less.

5. The positioning method according to claim 1, wherein the first array body has the first periodic structure having a period of 20 or more, and
the second array body has the second periodic structure having a period of 20 or more.

6. A method for manufacturing a layered body including a first object and a second object, the method comprising:
a layering step of layering the first object and the second object such that neither a first array body having a first periodic structure having a period $p_1$ nor a second array body having a second periodic structure having a period $p_2$ provided in the first object overlaps the second array body or the first array body provided in the second object when the first object and the second object are layered;
a detection step of detecting, after the layering step, first light obtained from the first array body provided in the first object as a first signal, second light obtained from the second array body as a second signal, third light obtained from the second array body provided in the second object as a third signal, and fourth light obtained from the first array body as a fourth signal;
a calculating step of calculating positional deviation between the first object and the second object by respectively fitting the detected first signal, the detected second signal, the detected third signal, and the detected fourth signal; and
an adjustment step of adjusting the positional deviation.

7. A positioning device for layering a first object and a second object and positioning positional deviation between the first object and the second object, the positioning device comprising:
a layering means for layering the first object and the second object such that neither a first array body having a first periodic structure having a period $p_1$ nor a second array body having a second periodic structure having a period $p_2$ provided in the first object overlaps the second array body or the first array body provided in the second object when the first object and the second object are layered;
a detecting means for detecting, for a layered body in which the first object and the second object are layered, first light obtained from the first array body provided in the first object as a first signal, second light obtained from the second array body as a second signal, third light obtained from the second array body provided in the second object as a third signal, and fourth light obtained from the first array body as a fourth signal;
a calculating means for calculating the positional deviation between the first object and the second object by respectively fitting the detected first signal, the detected second signal, the detected third signal, and the detected fourth signal; and
an adjusting means for adjusting the positional deviation.

8. A layered body manufacturing device for manufacturing a layered body by layering a first object and a second object, the layered body manufacturing device comprising:
a layering means for layering the first object and the second object such that neither a first array body having a first periodic structure having a period $p_1$ nor a second array body having a second periodic structure having a period $p_2$ provided in the first object overlaps the second array body or the first array body provided in the second object when the first object and the second object are layered;
a detecting means for detecting, for a layered body in which the first object and the second object are layered, first light obtained from the first array body provided in the first object as a first signal, second light obtained from the second array body as a second signal, third light obtained from the second array body provided in the second object as a third signal, and fourth light obtained from the first array body as a fourth signal;
a calculating means for calculating positional deviation between the first object and the second object by respectively fitting the detected first signal, the detected second signal, the detected third signal, and the detected fourth signal; and
an adjusting means for determining a layering position by adjusting the positional deviation.

* * * * *